(12) United States Patent
Anazawa et al.

(10) Patent No.: US 11,073,896 B2
(45) Date of Patent: Jul. 27, 2021

(54) STORAGE DEVICE AND A POWER CONTROL METHOD FOR STORAGE DEVICE

(71) Applicant: Toshiba Memory Corporation, Tokyo (JP)

(72) Inventors: Mitsuru Anazawa, Sagamihara Kanagawa (JP); Norikazu Yoshida, Kawasaki Kanagawa (JP); Takashi Yamaguchi, Yokohama Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 204 days.

(21) Appl. No.: 16/174,959

(22) Filed: Oct. 30, 2018

(65) Prior Publication Data
US 2019/0286219 A1 Sep. 19, 2019

(30) Foreign Application Priority Data
Mar. 13, 2018 (JP) .............................. JP2018-045673

(51) Int. Cl.
G06F 1/32 (2019.01)
G06F 1/28 (2006.01)
G06F 1/3287 (2019.01)
G06F 3/06 (2006.01)

(52) U.S. Cl.
CPC .............. *G06F 1/3287* (2013.01); *G06F 1/28* (2013.01); *G06F 3/068* (2013.01); *G06F 3/0625* (2013.01); *G06F 3/0634* (2013.01)

(58) Field of Classification Search
CPC ................................... G06F 1/32; G06F 1/28
See application file for complete search history.

(56) References Cited

U.S. PATENT DOCUMENTS

| 9,530,461 | B2 | 12/2016 | Akers et al. | |
|---|---|---|---|---|
| 9,568,987 | B2 | 2/2017 | Anazawa et al. | |
| 10,754,560 | B2 * | 8/2020 | Matsuyama | G06F 3/0659 |
| 2008/0168219 | A1 * | 7/2008 | Molaro | G06F 11/1435 |
| | | | | 711/112 |
| 2009/0158061 | A1 * | 6/2009 | Schmitz | G06F 1/3228 |
| | | | | 713/300 |
| 2011/0131427 | A1 * | 6/2011 | Jorgenson | G06F 1/324 |
| | | | | 713/300 |

(Continued)

FOREIGN PATENT DOCUMENTS

JP 2011181011 A 9/2011

*Primary Examiner* — Phil K Nguyen
(74) *Attorney, Agent, or Firm* — Kim & Stewart LLP

(57) ABSTRACT

A storage device comprises a nonvolatile memory, a controller that controls access to the nonvolatile memory, and a power circuit that supplies power to the nonvolatile memory and the controller. The power circuit can control the supply of power to at least parts of the nonvolatile memory and at least parts of the controller. The controller executes a data save process when a sleep transition request is received from the host requesting at least one of a plurality of sleep states according to a requested sleep state of the sleep transition request. The controller provides the host with state transition determination information that includes at one of a power consumption amount for a transition to a sleep state from an idle state and power consumption amount for a transition from the sleep state to the idle state.

13 Claims, 15 Drawing Sheets

(56) References Cited

U.S. PATENT DOCUMENTS

| | | | |
|---|---|---|---|
| 2011/0173474 A1* | 7/2011 | Salsbery | G06F 1/206 |
| | | | 713/323 |
| 2014/0143573 A1 | 5/2014 | Ishihara et al. | |
| 2015/0074330 A1* | 3/2015 | Sawamura | G06F 1/3275 |
| | | | 711/103 |
| 2016/0156798 A1 | 6/2016 | Wang | |
| 2017/0038973 A1* | 2/2017 | Takano | G06F 3/0655 |
| 2017/0308398 A1* | 10/2017 | Pinto | G06F 3/0659 |

* cited by examiner

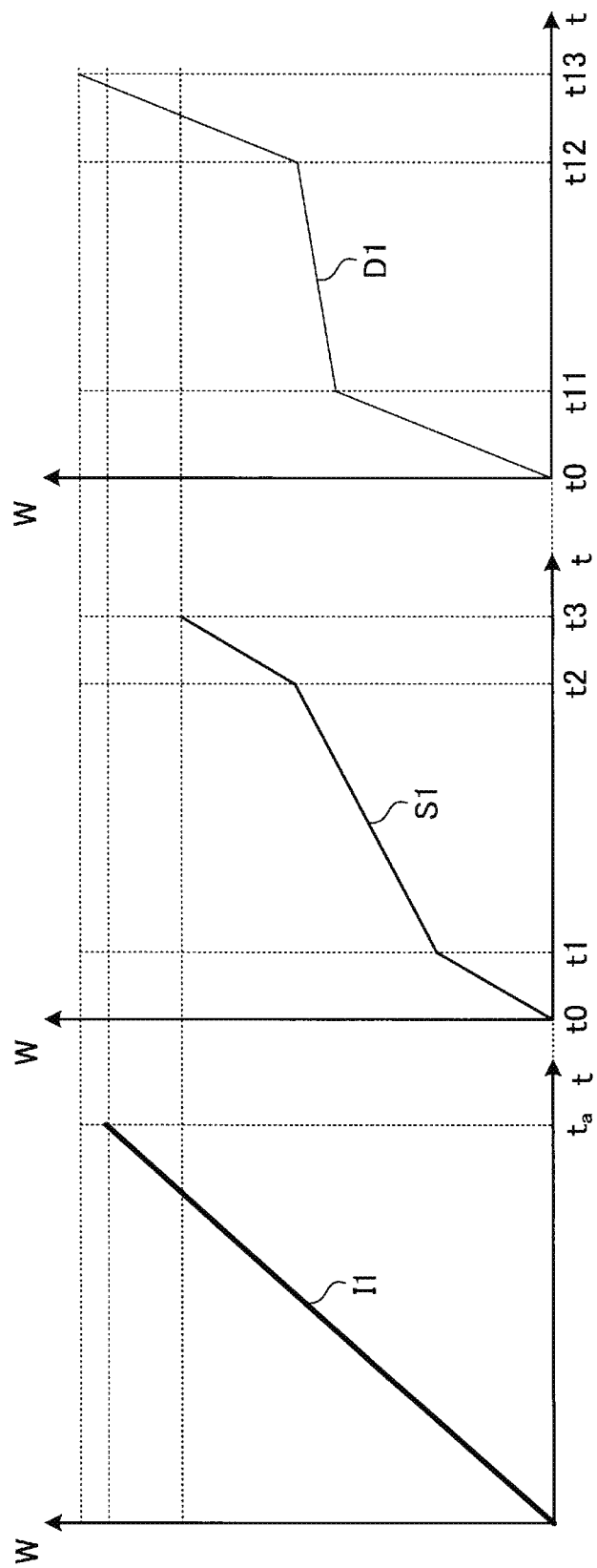

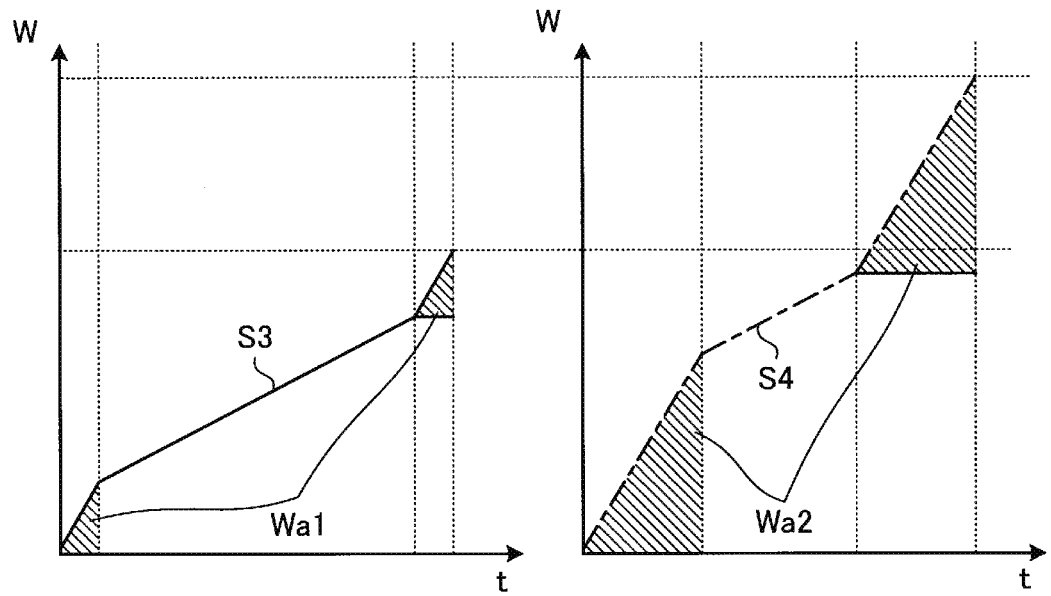
FIG. 11A          FIG. 11B
FIG. 12
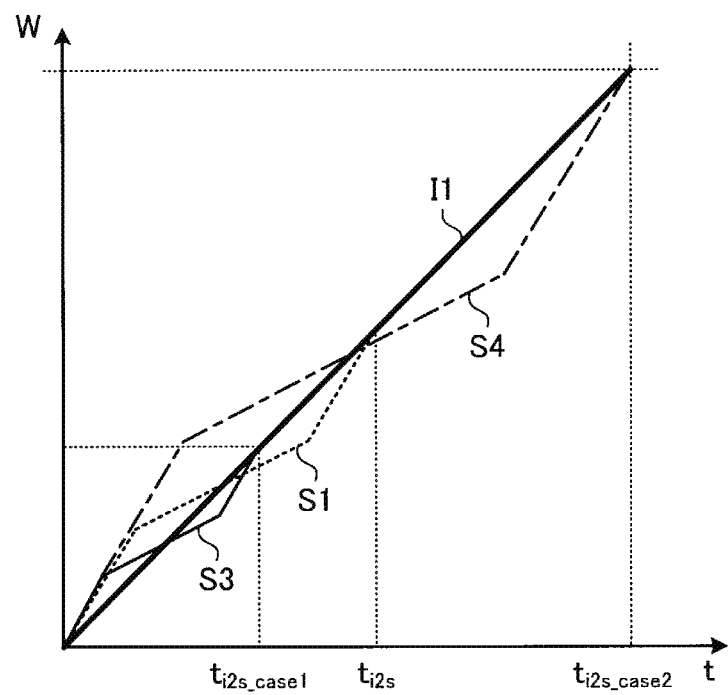

FIG. 15
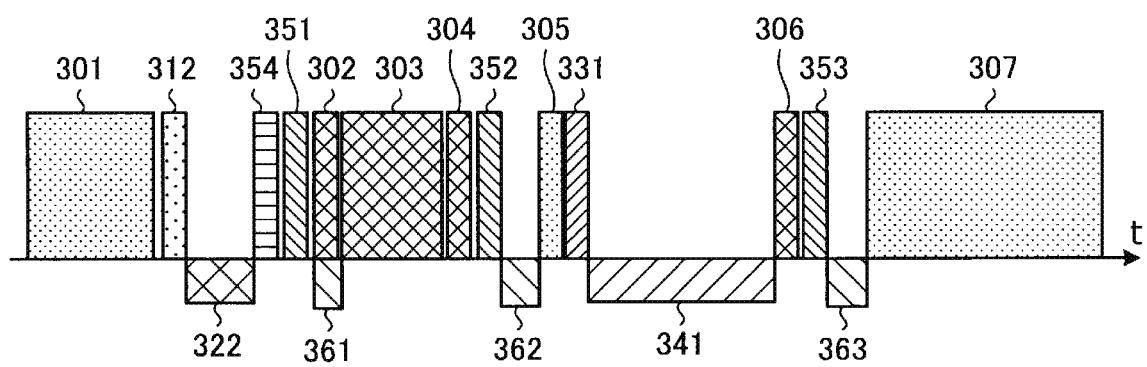
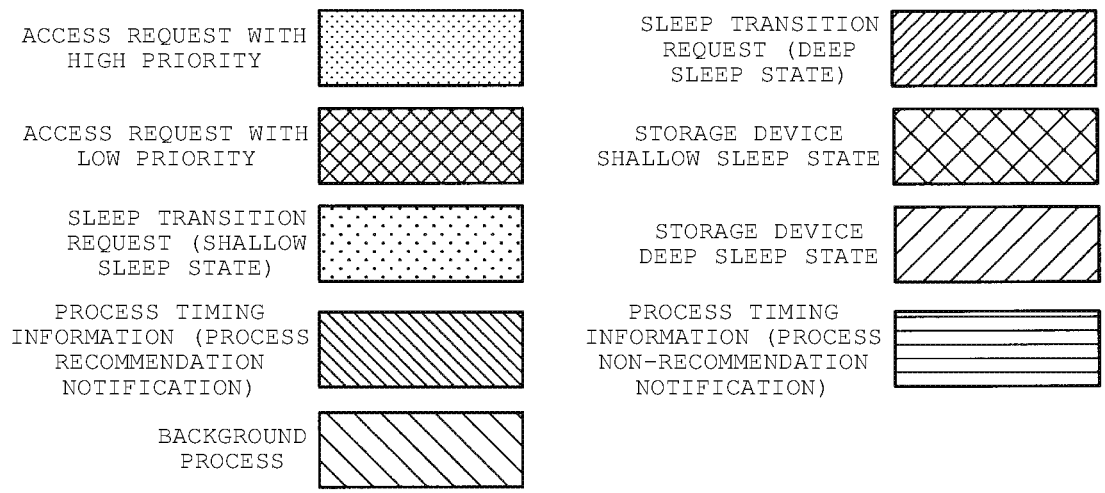

FIG. 16
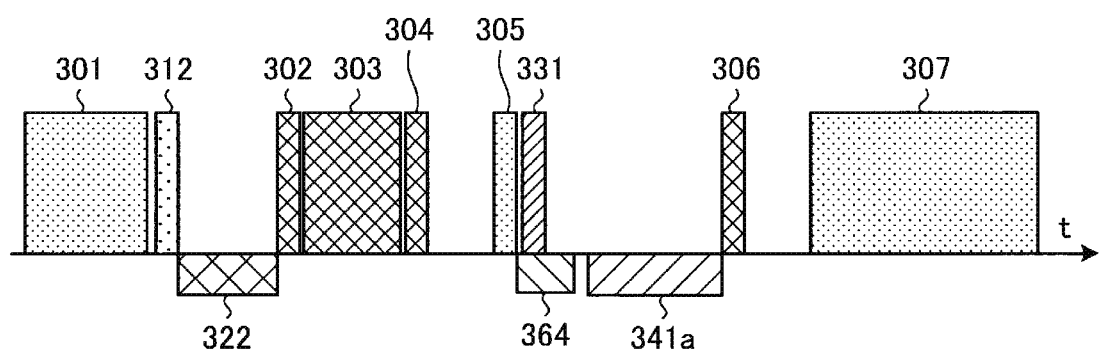
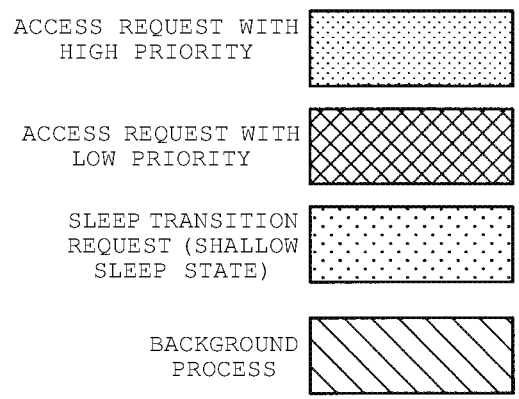
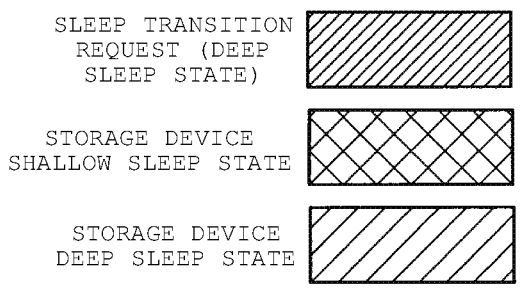

US 11,073,896 B2

STORAGE DEVICE AND A POWER CONTROL METHOD FOR STORAGE DEVICE

CROSS-REFERENCE TO RELATED APPLICATIONS

This application is based upon and claims the benefit of priority from Japanese Patent Application No. 2018-045673, filed Mar. 13, 2018, the entire contents of which are incorporated herein by reference.

FIELD

Embodiments described herein relate generally to a storage device and a power control method for the storage device.

BACKGROUND

In storage devices in which nonvolatile storage devices are used as storage media, a single sleep state or several different sleep states can be utilized to reduce power.

However, in the related art, the power consumed during the transition from an idle state to a sleep state may be higher than just maintaining the idle state. Accordingly, it is desirable to avoid power consumption increases caused by a transition to a sleep state.

DESCRIPTION OF THE DRAWINGS

FIGS. 5A, 5B, and 5C are diagrams illustrating a change of a power consumption amount over time in the idle state, the shallow sleep state, and the deep sleep state respectively.

FIGS. 11A and 11B are diagrams illustrating a change of power consumption amount at the time of transition from the idle state to the shallow sleep state.

FIG. 12 illustrates an example of a relation of a power consumption amount between the shallow sleep state and the idle state.

FIG. 15 schematically illustrates a relation of notification between scheduled access requests and processing timing information according to the fifth embodiment.

FIG. 16 schematically illustrates an example of a transition to a sleep state and aspects of an execution of a background process according to a comparative example.

DETAILED DESCRIPTION

In general, according to one embodiment, a storage device, comprises a nonvolatile memory, a controller that controls access to the nonvolatile memory, and a power circuit configured to supply power to the nonvolatile memory and the controller. The power circuit is configured to turn on or off the supply of power to at least parts of the nonvolatile memory and at least parts of the controller. The controller is configured to access the nonvolatile memory in response to an access request, execute a save process for data when a sleep transition request is received requesting one of a plurality of sleep states, and notify a host of transition determination information. The save process is executed according to a requested sleep state of the sleep transition request, and when the save process for the data ends, the power circuit stops the supply of the power to a part of the controller or the nonvolatile memory according to the requested sleep state.

According to another embodiment, there is provided a power control method for a storage device including a nonvolatile memory, a controller controlling access of data to the nonvolatile memory, and a power circuit switching ON and OFF of supply of power to the nonvolatile memory and the controller. The power control method for the storage device includes a reception process, a save process, and a power supply stop process. In the reception step, the controller receives an access request to the nonvolatile memory or a sleep transition request for requesting transition to a plurality of sleep states with different power consumptions. In the save process, the controller executes a save process for data corresponding to the requested sleep state when the sleep transition request is received. In the power supply stop process, a power circuit stops supply of power to a part of the controller or the nonvolatile memory in response to the request sleep state when the save process for the data ends.

Hereinafter, a storage device and a power control method for the storage device according to example embodiments will be described in detail with reference to the appended drawings. The scope of the present disclosure is not limited to the example embodiments.

First Embodiment

Figure 1:
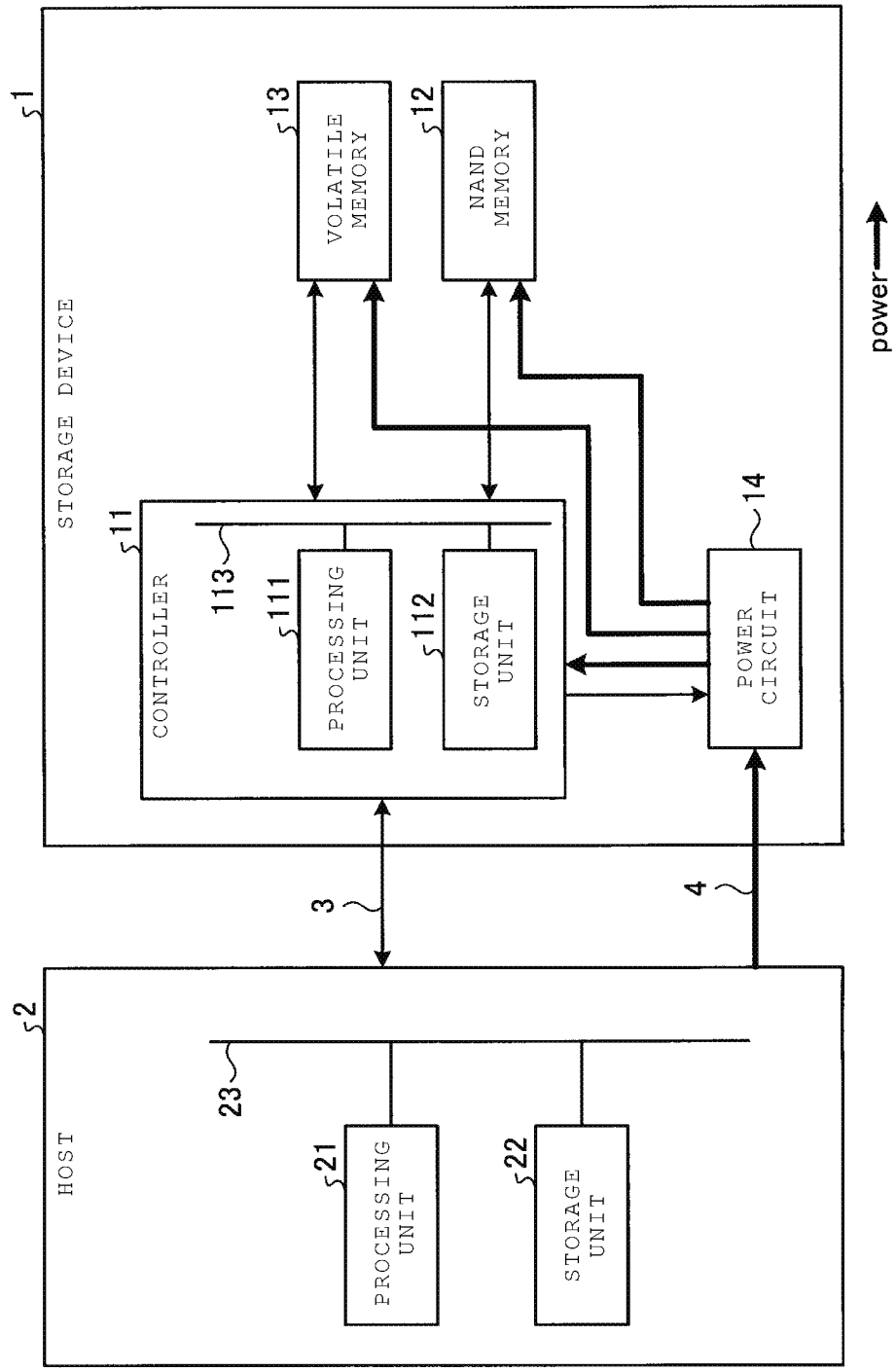
FIG. 1 illustrates an example of a storage device according to a first embodiment.

FIG. 1 is a diagram illustrating an example of a configuration of a storage device according to a first embodiment. A storage device 1 is connected to a host 2 via a communication path 3 and a power line 4. The storage device 1 functions in this example as an external device of the host 2. Any interface standard for the communication path 3 may be used. For example, PCI Express (PCIe®) or NVM Express (NVMe®) can be used as the interface standard for the communication path 3. The communication path 3 may also include the power line 4. In the following example, a storage device 1 which is a solid state device (SSD) will be described as an example.

The host 2 is, for example, a computer. In this context, "computer" includes a personal computer, a portable computer, or a portable communication device (e.g., smartphone). The host 2 includes a processing unit 21 and a storage unit 22 connected to each other via a bus 23. The processing unit 21 executes processes in accordance with a program loaded to the storage unit 22. The processing unit 21 is, for example, a central processing unit (CPU). The storage unit 22 is a nonvolatile storage unit such as a read-only memory (ROM) that stores a program to be executed by the processing unit 21 and a volatile storage unit such as a random access memory (RAM) to which a program to be executed by the processing unit 21 is loaded and data is temporarily stored. The processing unit 21 generates an access request for the storage device 1 and a sleep transition request for the storage device 1, schedules the access request and the sleep transition request, and transmits the access request and the sleep transition request to the storage device 1.

The storage device 1 includes a controller 11, a NAND flash memory 12 (also referred to as NAND memory 12), a volatile memory 13, and a power circuit 14.

The controller 11 transmits data to the volatile memory 13 and the NAND memory 12. The transmission of data is based on an instruction from the host 2 or on an instruction related to the state of the storage device 1. Possible instructions from the host 2 include a write command to write data to the NAND memory 12 and a read command to read data from the NAND memory 12. Possible instructions related to the state of the storage device 1 (state-related instructions) include a command to execute a garbage collection (compaction) process. The garbage collection process is a process of moving valid data from one block to another block to provide a free block in which only invalid data is currently stored.

The controller 11 has a plurality of areas having separate power sources. Thus, the power source for the different areas can be separately switched (ON/OFF) for each area in accordance with an instruction from the host 2. The controller 11 is, for example, a system on a chip (SoC).

The controller 11 includes a processing unit 111, a storage unit 112, and a bus 113 connecting the processing unit 111 to the storage unit 112. The processing unit 111 includes, for example, a complementary metal-oxide-semiconductor (CMOS) logical circuit and executes processing such as an arithmetical operation. The processing unit 111 may be configured in hardware or the function of the processing unit 111 may be realized by a CPU executing firmware. The storage unit 112 stores data to be used in or manipulated by the arithmetical operation of the processing unit 111. A volatile memory such as a static RAM (SRAM) or a dynamic RAM (DRAM) is used as the storage unit 112, for example.

The NAND memory 12 includes one or more NAND chips with memory cell arrays. In the memory cell array, a plurality of memory cells are arranged in a matrix form. In an individual memory cell array, a plurality of physical blocks, each of which corresponds to a unit of erasing, is arranged. Each physical block includes a plurality of pages, each of which is a unit of reading and writing for the memory cell array. In the NAND memory 12, erasing is executed in units of physical blocks.

The NAND memory 12 stores, for example, both user data and management information. The user data is data which has been written in accordance with an instruction from the host 2. The management information is information used by the controller 11 to access the NAND memory 12 and includes logical-to-physical address translation information. The logical-to-physical translation information is information for converting a logical address into a physical address. A write location or a read location instructed using the logical address is translated into a physical address of the NAND memory 12 using this management information and access to the NAND memory 12 is executed according to the logical-to-physical address conversion.

The volatile memory 13 stores, for example, the management information. When the storage device 1 is boot up, the volatile memory 13 stores latest management information read from the NAND memory 12. In conjunction with writing and erasing of user data or a garbage collection process in the NAND memory 12, the management information in the volatile memory 13 is updated by the controller 11. The updated management information is then stored in the NAND memory 12 at a later time.

The volatile memory 13 may be used by the controller 11 as a buffer for transmitting data between the host 2 and the NAND memory 12.

In this example, the power circuit 14 receives power from the host 2 via the power line 4 and switches between ON and OFF for supply of the power to the controller 11, the NAND memory 12, and the volatile memory 13 in accordance with an instruction form the controller 11. The supply of the power to the controller 11 may be switched to OFF by the power circuit 14 and may also be switched to OFF by an internal switch inside the controller 11.

The storage device 1 according to the first embodiment can be switched from an active mode to a sleep mode to reduce power consumption. The active mode is a mode in which the whole processing unit 111, the NAND memory 12, and the volatile memory 13 are operating. The active mode includes an operation state, in which processes are executed in accordance with instructions from the host 2 and state-related instructions for the storage device 1, and an idle state, in which processes are not being executed by the processing unit 111 because no recent instructions have been received from the host 2.

The sleep mode is a mode in which all or some parts of the processing unit 111 does not operate. In the first embodiment, the sleep mode includes a shallow sleep state and a deep sleep state with different power consumption levels. The power consumption in the deep sleep state is less than the power consumption in the shallow sleep state.

Figure 2:
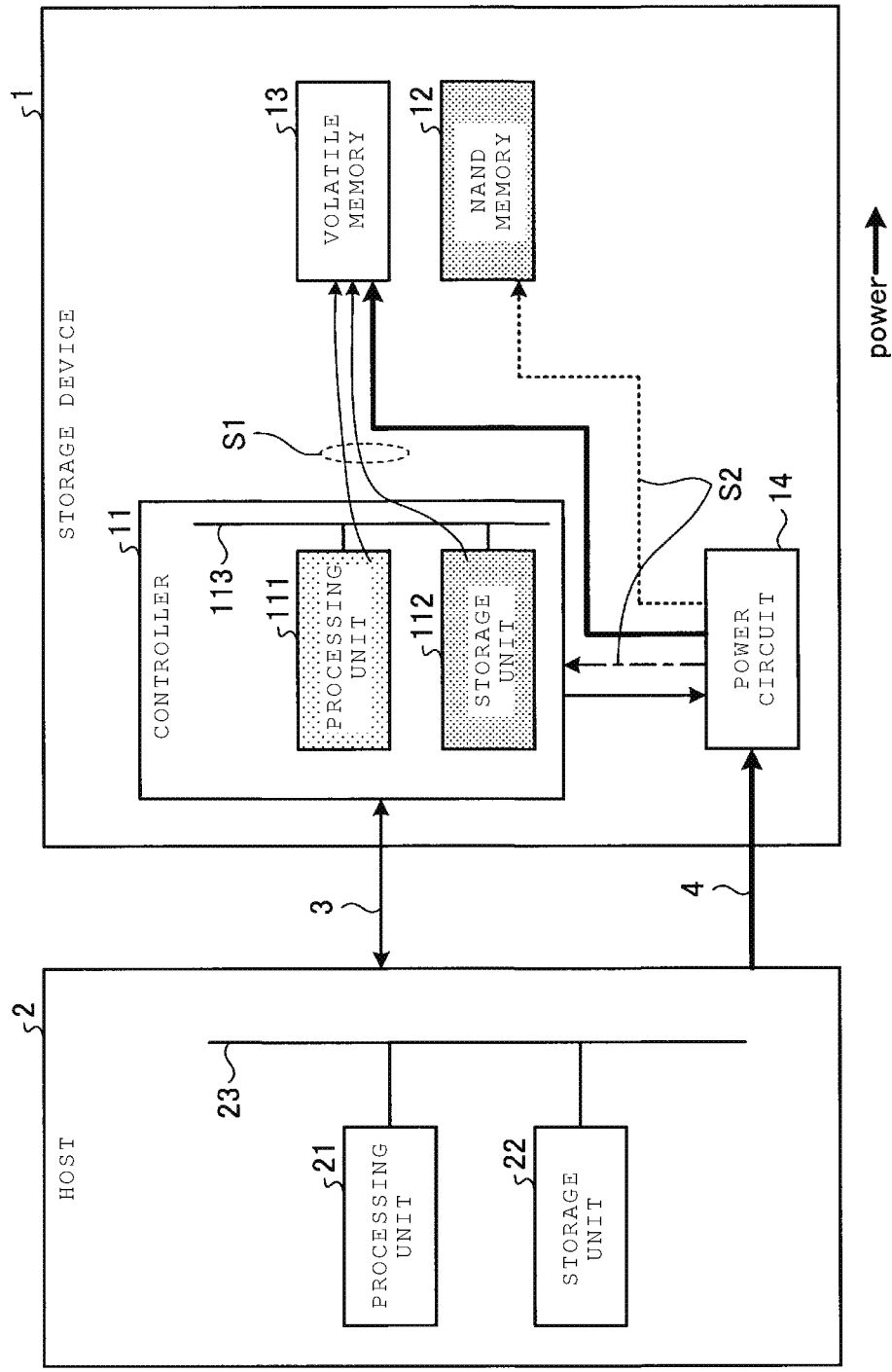
FIG. 2 schematically illustrates a shallow sleep state according to the first embodiment.
Figure 3:
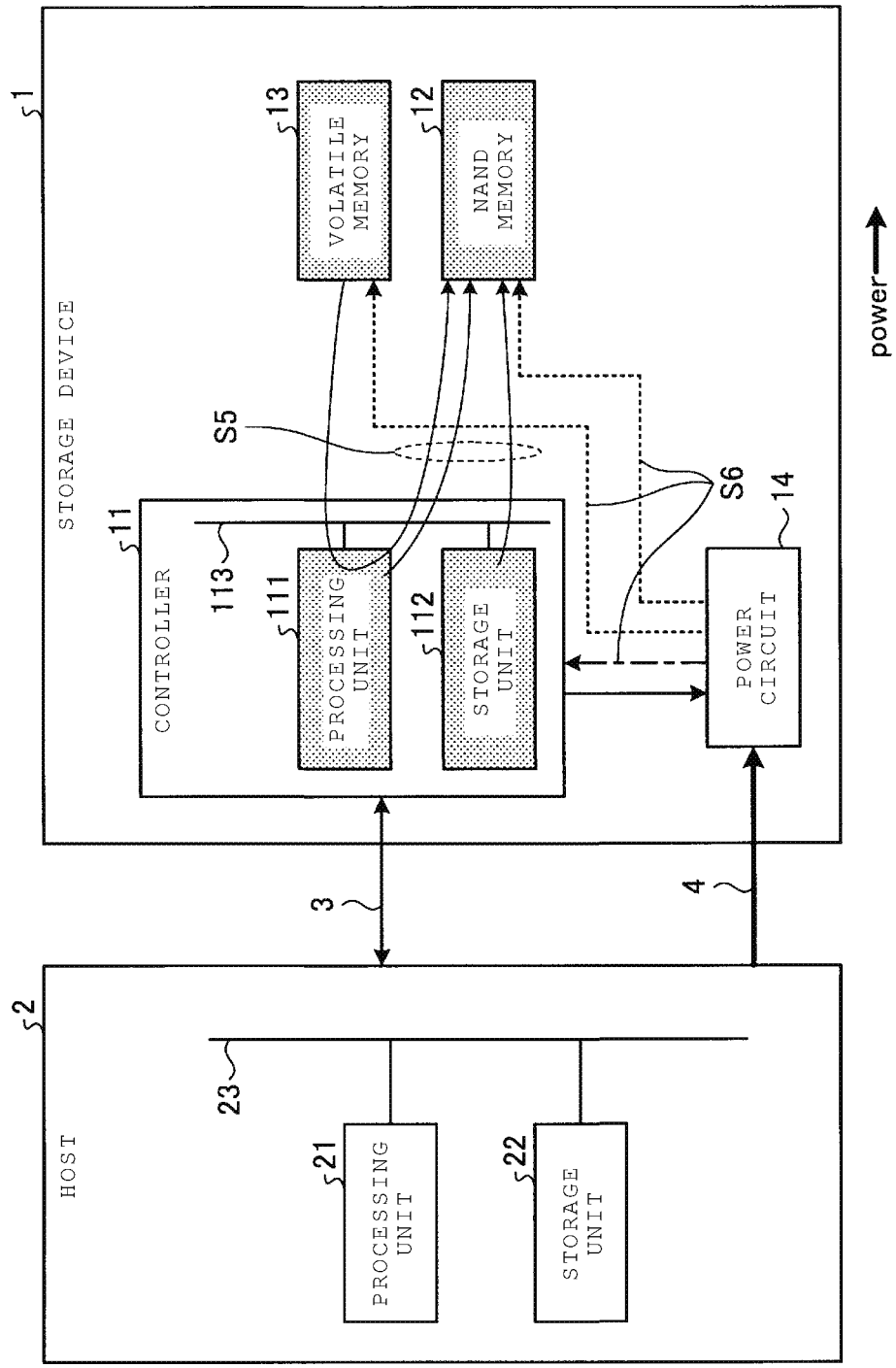
FIG. 3 schematically illustrates a deep sleep state according to the first embodiment.

FIG. 2 is a diagram schematically illustrating the shallow sleep state according to the first embodiment. FIG. 3 is a diagram schematically illustrating the deep sleep state according to the first embodiment.

As illustrated in FIG. 2, in the shallow sleep state, supply of power to the NAND memory 12 and parts of the processing unit 111 and the storage unit 112 of the controller 11 is switched off. At the time of transition from the idle state to the shallow sleep state, the processing unit 111 saves a value of each register of the processing unit 111 and data in the storage unit 112 to the volatile memory 13 (a process denoted by S1 in FIG. 2) and subsequently the power circuit 14 switches off the supply of the power to parts of the processing unit 111, the storage unit 112, and the NAND memory 12 (a process denoted by S2 in FIG. 2). Power is supplied to the volatile memory 13 and the circuit of the processing unit 111 necessary for returning to the active mode. In FIG. 2, a dotted arrow indicates a state in which supply of power is switched off and a dashed arrow indicates a state in which supply of power is partially switched off.

As illustrated in FIG. 3, in the deep sleep state, supply of power to parts of the processing units 111 and the storage unit 112 of the controller 11, the volatile memory 13, and the NAND memory 12 is switched off. The parts of the processing unit 111 and the storage unit 112 for which the supply of the power is switched off may be different in the deep sleep state and the shallow sleep state. In general, supply of power to a larger area is switched off in the deep sleep state than in the shallow sleep state. At the time of transition from the active mode to the deep sleep state, the processing unit 111 saves a value of each register of the processing unit 111 and data in the storage unit 112 and the volatile memory 13 to the NAND memory 12 (a process denoted by S5 in FIG. 3) and subsequently the power circuit 14 switches off the supply of the power to a part of the processing unit 111, the storage unit 112, the volatile memory 13, and the NAND memory 12 (a process denoted by S6 in FIG. 3). Power is still supplied to a circuit necessary for returning to the active mode. However, since the supply of the power to the volatile memory 13 is also switched off (as compared to the shallow sleep state of FIG. 2), the power consumption in the deep sleep state is less than the power consumption in the shallow sleep state.

Figure 4A:
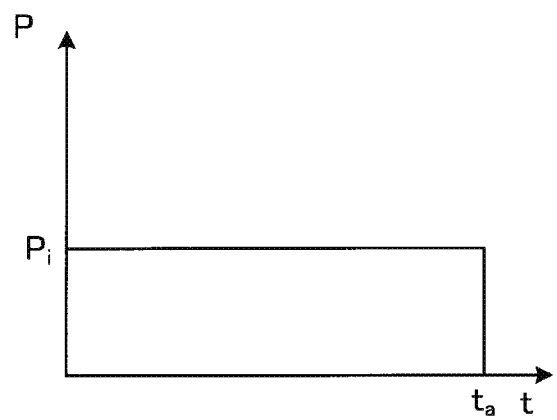
FIGS. 4A, 4B, and 4C are diagrams illustrating a change of power consumption over time in an idle state, the shallow sleep state, and the deep sleep state respectively.
Figure 4B:
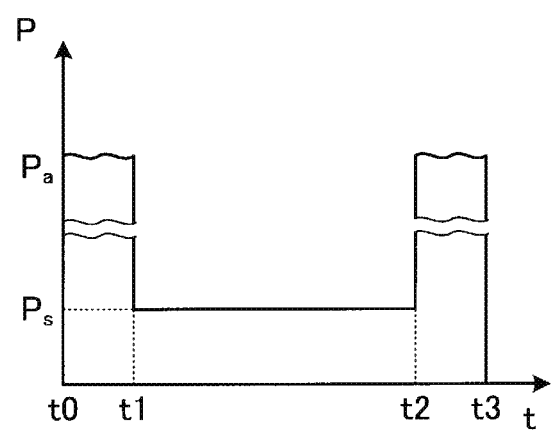
Figure 4C:
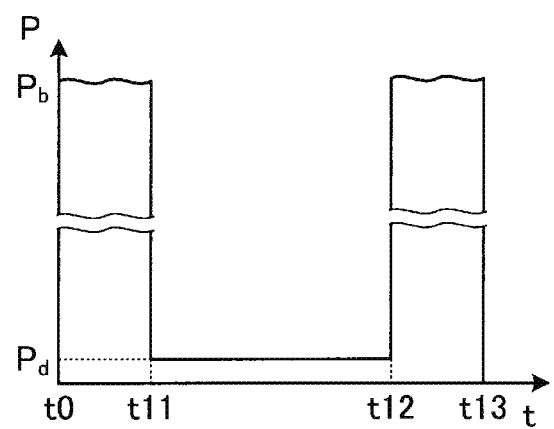

FIGS. 4A to 4C are diagrams illustrating a change of power consumption over time in the idle state, the shallow sleep state, and the deep sleep state respectively. FIGS. 5A to 5C are diagrams illustrating a change of a power consumption amount over time in the idle state, the shallow sleep state, and the deep sleep state respectively. FIG. 5A is a graph representing power consumed over time in the idle state, FIG. 5B is a graph representing power consumed over time in the shallow sleep state, and FIG. 5C is a graph representing power consumed over time in the deep sleep state. Here, the graphs in FIGS. 4B and 5B also include a save process for transition to the shallow sleep state and a returning process for transition from the shallow sleep state to the idle state. The graphs in FIGS. 4C and 5C also include a save process for transition to the deep sleep state and a returning process for transition from the deep sleep state to the idle state. In FIGS. 4A to 4C, the horizontal axis represents time and the vertical axis represents power consumption rate. In FIGS. 5A to 5C, the horizontal axis represents time and the vertical axis represents power consumption amount (total amount consumed from to onward). The graphs illustrated in FIGS. 5A to 5C are obtained by integrating each graph of FIGS. 4A to 4C with respect to time.

As illustrated in FIG. 4A, the idle state is a state in which the level of power consumption is constant over time (to $t_a$) at power level $P_1$. In this context, the idle state is the state in which consumed power is the lowest amongst the various states in which the processing unit 111, the storage unit 112, the NAND memory 12, and the volatile memory 13 are operating. A power consumption amount $W_i$ for the idle state for a time $t_a$ is the product of the power consumption $P_i$ and the time $t_a$, as illustrated in FIG. 5A.

On the other hand, in the shallow sleep state, power consumption $P_s$ in the shallow sleep state is less than the power consumption $P_i$ of the idle state. However, at the time of transition from the idle state to the shallow sleep state, as illustrated in FIG. 2, a process of saving values of the register inside the processing unit 111 and data of the storage unit 112 to the volatile memory 13 (hereinafter referred to as a save process) must occur. Also, at the time of return from the shallow sleep state to the idle state, a process of re-setting the values of the register that were saved in the volatile memory 13 (at transition from the idle state to the shallow sleep state) for the processing unit 111 and restoring the data saved in the volatile memory 13 to the storage unit 112 (hereinafter referred to as a returning process) is executed. In FIG. 4B, the power consumption $P_a$ during the save process (executed from time t0 to time t1) and the returning process (executed from time t2 to time t3) is greater than the power consumption $P_i$. In this way, with regard to the power consumption amount at the time of transition to the shallow sleep state, not only the power consumption $P_s$ at the time of the shallow sleep state but also the power consumption $P_a$ at the time of the save process and the returning process have to be considered. The power consumption amount during the shallow sleep state (FIG. 4B) is illustrated in FIG. 5B.

The case of the deep sleep state is similar to that of the shallow sleep state. As illustrated in FIG. 4C, power consumption $P_d$ during the deep sleep state is less than the power consumption $P_i$ of the idle state and the power consumption $P_s$ during the shallow sleep state. However, power consumption $P_b$ during the save process executed from time t0 to time t11 and the returning process executed from time t12 to time t13 is greater than the power consumption $P_a$ of the shallow sleep state. This is because a region in which supply of power is switched off to reduce power is greater in the deep sleep state than the shallow sleep state. That is, $P_a < P_b$ is satisfied since an amount of data to be saved and a process for the saving increases. The power consumption amount during the deep sleep state illustrated in FIG. 4C is illustrated in FIG. 5C. In the foregoing description, the example in which the power consumptions $P_a$ and $P_b$ during the returning process are the same as the power consumptions $P_a$ and $P_b$ during the save process has been described, but the power consumptions $P_a$ and $P_b$ during the returning process may be different from the power consumptions $P_a$ and $P_b$ during the save process.

In this way, when the power consumption during transition process, including the save process and the returning process, is considered in the transition to the sleep mode, a power consumption amount in the sleep mode might be greater than that in the idle state depending on a time in which the sleep mode continues.

Figure 6:
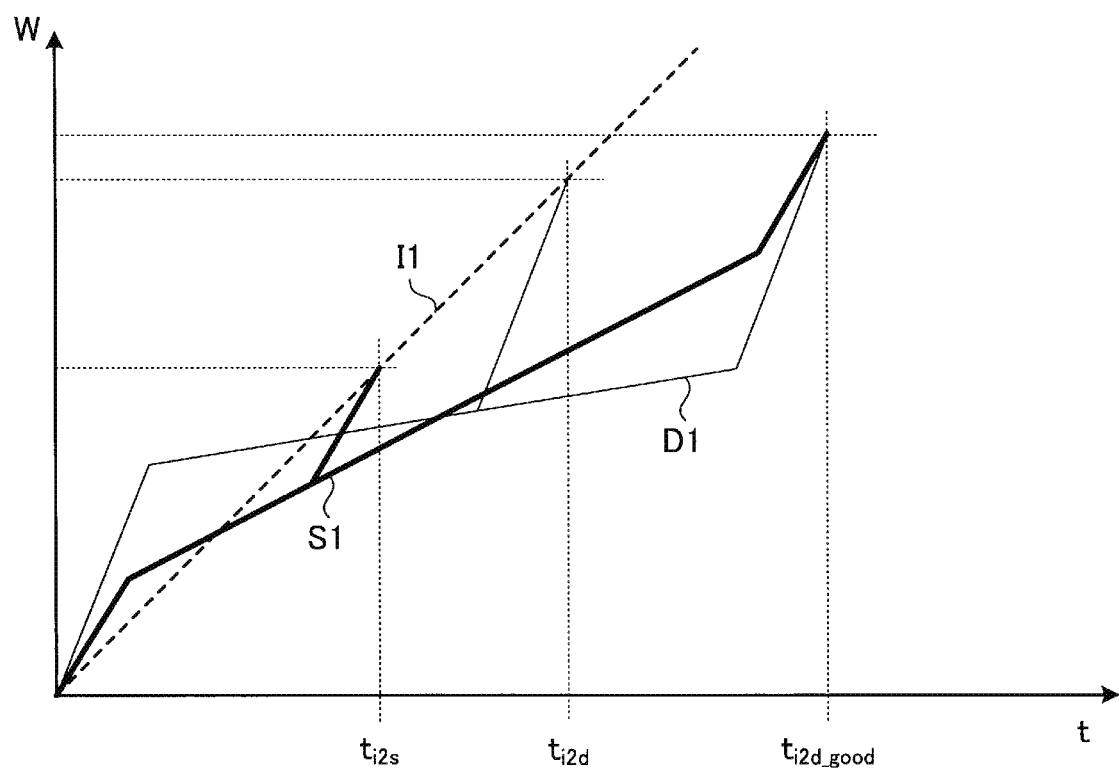
FIG. 6 illustrates a power consumption amount in each of the idle state, the shallow sleep state, and the deep sleep state.

FIG. 6 is a diagram illustrating a power consumption amount in each of the idle state, the shallow sleep state, and the deep sleep state. In the drawing, the horizontal axis represents time and the vertical axis represents a power consumption amount in each state. The label "I1" denotes a straight line indicating a power consumption amount when the idle state simply continues. The label "S1" denotes a variably sloped line indicating a power consumption amount in changing from the idle state to the shallow sleep state and back, and the label "D1" denotes a variably sloped line indicating a power consumption amount in changing from the idle state to the deep sleep state and back. Here, time $t_{i2s}$ is a time at which the power consumption amount for simply continuing the idle state matches the power consumption amount for transitioning from the idle state to the shallow sleep state and back again to the idle state. The time $t_{i2d}$ is the time at which the power consumption amount for simply continuing the idle state matches the power consumption amount for transitioning from the idle stat to the deep sleep state and back again to the idle state. The time $t_{i2d\_good}$ is the time at which the power consumption amount for transitioning from the idle state to the deep sleep state and back matches the power consumption amount for transitioning from the idle state to the shallow sleep state and back.

When the idle state is compared to the shallow sleep state, the power consumption amount in the idle state is less than the power consumption amount for the shallow sleep state for any period shorter than time $t_{i2s}$. Conversely, for any period longer than time $t_{i2s}$, the power consumption amount for the shallow sleep state is lower than the power consumption amount in the idle state. Therefore, when an operation is not executed for a period shorter than time $t_{i2s}$, the idle state remains continuing. When an operation is not executed for a period longer than time $t_{i2s}$, the device state is caused to transition to the shallow sleep state. In this way, the consumed power amount can be reduced.

When the idle state is compared to the deep sleep state, the power consumption amount in the idle state is less than the power consumption amount for the deep sleep state for any period shorter than time $t_{i2d}$. Conversely, for any period longer than time $t_{i2d}$, the power consumption amount for the deep sleep state is lower than the power consumption amount in the idle state. Therefore, when an operation is not executed for a period shorter than time $t_{i2d}$, the idle state remains continuing. When an operation is not executed for a period longer than time $t_{i2d}$, the state is caused to transition to the deep sleep state. In this way, the consumed power amount can be reduced.

When the shallow sleep state is compared to the deep sleep state, the power consumption amount in the shallow sleep state is less than the power consumption amount for the deep sleep state for any period shorter than time $t_{i2d\_good}$. Conversely, for any period longer than time $t_{i2d\_good}$, the power consumption amount for the deep sleep state is lower than the power consumption amount in the shallow sleep state. Therefore, when an operation is not executed for a period shorter than time $t_{i2d\_good}$, the state transitions to the shallow sleep state. When an operation is not executed for a period longer than time $t_{i2d\_good}$, the device state is caused to transition to the deep sleep state. In this way, the consumed power amount can be reduced.

When the foregoing results are combined, a reduction in power consumption can be obtained remaining in the idle state without transitioning to the sleep mode so long as the idle state continues for a period less than time $t_{i2s}$. When the idle state continues for a period longer than time $t_{i2s}$, a reduction in power consumption can be obtained by transitioning to the shallow sleep state. When the idle state continues for a period longer than time $t_{i2d}$, a reduction in power consumption can be obtained by transitioning to the deep sleep state. Here, when the idle state continues for a period from time $t_{i2s}$ to time $t_{i2d\_good}$, the state is caused to transition to the shallow sleep state. When the idle state continues for a period longer than time $t_{i2d\_good}$, the shallow sleep state is caused to transition to the deep sleep state. In this way, a reduction in power consumption can be obtained.

Accordingly, in the first embodiment, minimum state continuation times $t_{i2s}$, $t_{i2d}$, and $t_{i2d\_good}$ of the idle state are stored as transition determination information in the NAND memory 12 and the controller 11 notifies the host 2 of the transition determination information in advance. A timing at which the host 2 is notified of the transition determination information is, for example, a time of initialization (or a time of restart) of the storage device 1. The host 2 schedules timings of commands to be issued to the storage device 1 based on the transition determination information and gives an instruction to transition the storage device 1 to adopt the idle state, the shallow sleep state, or the deep sleep state according to the scheduling result.

In calculating the transition determination information, average values can be obtained by measuring power consumptions in several different actual transition and returning processes under various situations and then averaging these measurement results may be used to determine a value for power consumption $P_a$ in the transition process and the returning process in the shallow sleep state in FIG. 4B and the power consumption $P_b$ in the transition process and the returning process in the deep sleep state in FIG. 4C. Alternatively, power consumption $P_{a\_max}$ and $P_{b\_max}$, which are maximum values in transitions from the idle state to the shallow sleep state or the deep sleep state may be adopted and these power consumptions $P_{a\_max}$ and $P_{b\_max}$ values may be used to set a value for power consumption $P_a$ and $P_b$.

Figure 7:
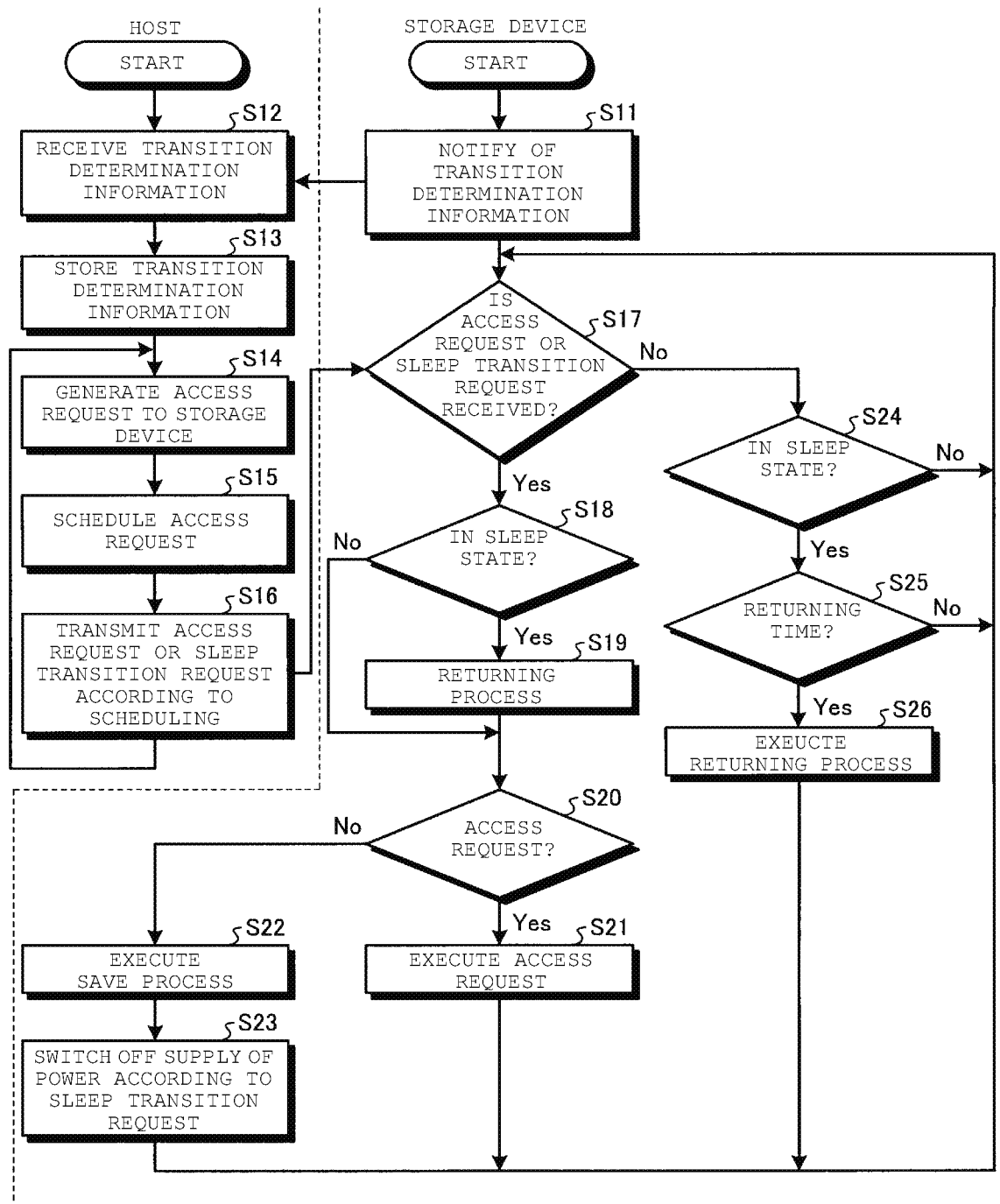
FIG. 7 is a flowchart of a procedure of a power control method for the storage device according to the first embodiment.

FIG. 7 is a flowchart illustrating an example of a procedure of a power control method for the storage device according to the first embodiment. For example, once the storage device 1 is started, the controller 11 of the storage device 1 notifies the host 2 of the transition determination information stored in a predetermined region of the NAND memory 12 (step S11). The processing unit 21 of the host 2 receives the transition determination information (step S12) and stores the transition determination information in, for example, the storage unit 22 (step S13).

Subsequently, the processing unit 21 of the host 2 generates an access request for the storage device 1 (step S14) and schedules the access request (step S15). Here, the scheduling is executed with a priority placed on a reduction in power. When the transition to the shallow sleep state or the transition to the deep sleep state is included in the schedule as a result of the scheduling, a transition request to the shallow sleep state is generated before the transition to the shallow sleep state and a transition request to the deep sleep state is generated before the transition to the deep sleep state.

For example, when there is a time between the access requests in the scheduling, the time is compared to the transition determination information and one of the idle state, the shallow sleep state, and the deep sleep state can be selected. When there is an access request for which a priority level is relatively low (hereinafter referred to as an access request with a low priority) among the access requests for the storage device 1, the access request with the low priority is scheduled so that blocks of a time in which no access is requested around the access request with the low priority are combined to generate a relatively long time block in which no access is requested. Then, the length of time in which no access is requested is compared to the transition determination information and the time period in which no access is requested is determined to be one of the idle state, the shallow sleep state, and the deep sleep state. The access request with the low priority is an access request for which a response to the access request may be delayed. In contrast, an access request for which a response to the access request is not permitted to be late is an access request for which a priority level is high (hereinafter referred to as an access request with a high priority).

Thereafter, the processing unit 21 of the host 2 transmits an access request or a sleep transition request to the storage device 1 according to the scheduling (step S16). The host 2 may also supply the storage device 1 with a returning time from the shallow sleep state or the deep sleep state when transmitting the sleep transition request. Thereafter, in the host 2, the process returns to step S14.

The storage device 1 determines whether an access request or a sleep transition request has been received (step S17). When the access request or the sleep transition request is received (Yes in step S17), the processing unit 111 of the controller 11 determines whether the present state is a sleep state (step S18). When the present state is the sleep state (Yes in step S18), the processing unit 111 executes the returning process (step S19).

After step S19 or if the present state is not the sleep state (No in step S18), the processing unit 111 of the controller 11 determines whether the request received from the host 2 is an access request (step S20). When the request is an access request (Yes in step S20), the access request is executed (step S21) and the process in the storage device 1 returns to step S17.

Conversely, when the request received from the host 2 is not an access request (No in step S20), the processing unit 111 of the controller 11 executes the save process because the request is a sleep transition request (step S22). For example, in the case of the transition to the shallow sleep state, the processing unit 111 saves a value of the register in the processing unit 111 and data in the storage unit 112 to the volatile memory 13. In the case of the transition to the deep sleep state, the processing unit 111 saves a value of the register in the processing unit 111 and data in the storage unit 112 and the volatile memory 13 to the NAND memory 12.

The processing unit 111 notifies the power circuit 14 of an instruction to switch off the supply of the power in response to the sleep transition request and the power circuit 14 switches off the supply of the power according to the instruction (step S23). For example, in the case of the transition to the shallow sleep state, the power circuit 14 switches off the supply of the power to a predetermined portion of the processing unit 111, the storage unit 112, and the NAND memory 12. In the case of the transition to the deep sleep state, the power circuit 14 switches off the supply of the power to a predetermined portion in the processing unit 111, the storage unit 112, the NAND memory 12, and the volatile memory 13. Thereafter, the process returns to step S17.

When neither an access request nor a sleep transition request is received in step S17 (No in step S17), the processing unit 111 of the controller 11 determines whether the present state is a sleep state (step S24). When the present state is a sleep state (Yes in step S24), the processing unit 111 determines whether the current time is the returning time supplied from the host 2 (step S25). When the current time is the returning time (Yes in step S25), the processing unit 111 executes the returning process (step S26). For example, in the case of returning from the shallow sleep state, the processing unit 111 sets a value of the register saved in the volatile memory 13 to the processing unit 111 and writes the data saved in the volatile memory 13 into the storage unit 112. In the case of returning from the deep sleep state, the processing unit 111 sets a value of the register saved in the NAND memory 12 to the processing unit 111 and writes the data saved in the NAND memory 12 into the storage unit 112 and the volatile memory 13. If the present state is not the sleep state in step S24 (No in step S24) or when the time is not the returning time in step S25 (No in step S25), the process in the storage device 1 returns to step S17. As described above, the power control method for the storage device 1 is executed.

Figure 8:
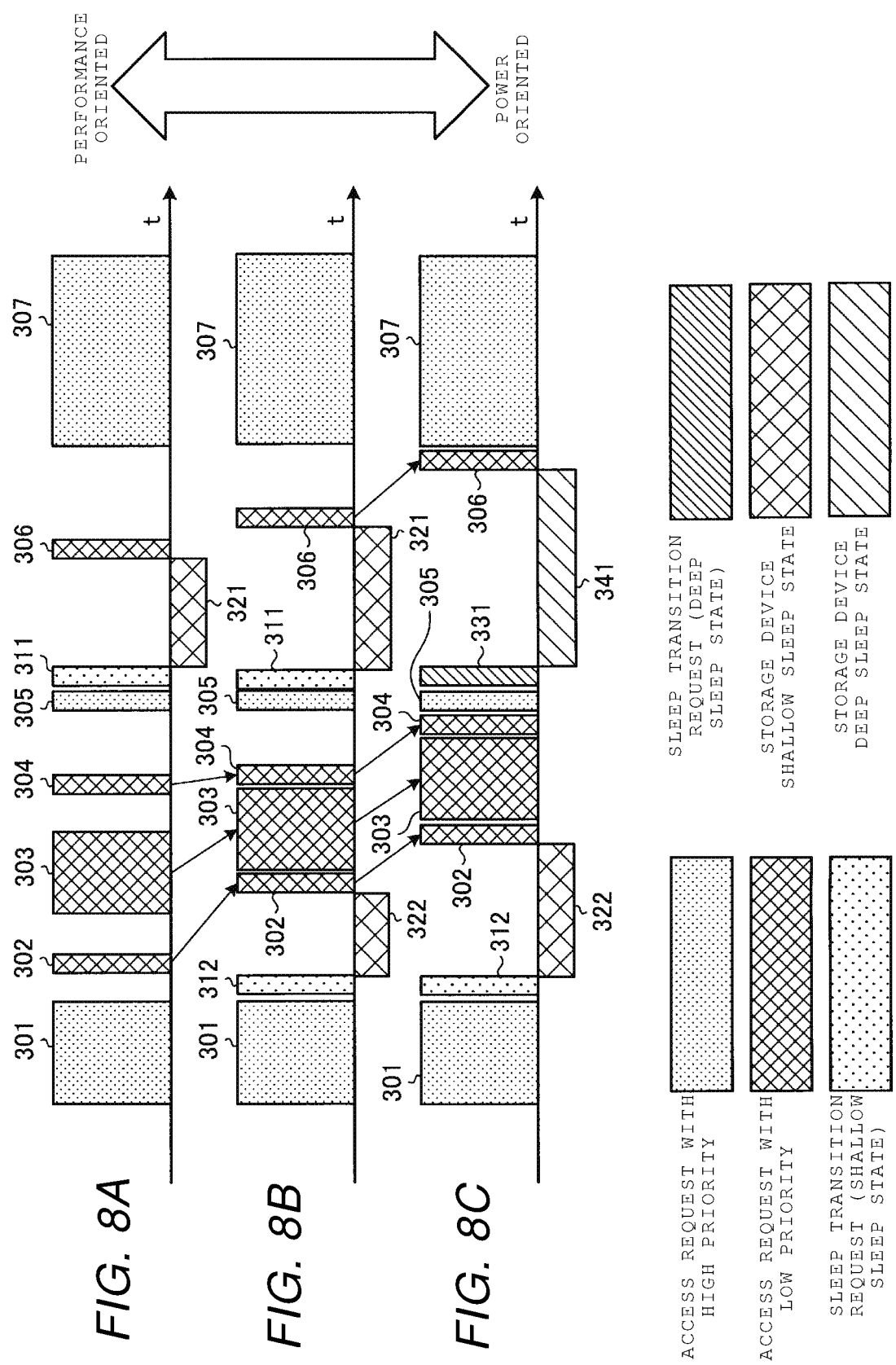
FIGS. 8A, 8B, 8C are diagrams schematically illustrating an example of scheduling of an access request by a host.

FIGS. 8A to 8C are diagrams schematically illustrating an example of scheduling of an access request by a host. FIG. 8A illustrates an example of scheduling of access requests when performance is prioritized. Access requests 301, 305, and 307 with high priority and access requests 302 to 304 and 306 with low priority are depicted. When performance is prioritized, there will be much time in which access is not executed between the access requests. In a case where transition to the sleep mode will result in a reduction in power based on comparison between the transition determination information and the time in which the access is not executed, the transition request to the sleep mode is generated. For example, since a state continuation time of the idle state between the access request 305 with high priority and the access request 306 with low priority is equal to or greater than time $t_{i2s}$, a transition request 311 for transition to the shallow sleep state is provided and thus the device state subsequently transitions to the shallow sleep state 321.

FIG. 8B illustrates an example of scheduling of access requests when power reduction is prioritized. In FIG. 8A, much time in which access is not executed before the access request with low priority is provided. In FIG. 8B, by scheduling access requests so that the access requests 302 to 304 with low priority are made in rapid succession, a time in which an access is not executed for a time in which transition to the shallow sleep state is possible is ensured between the access request 301 with high priority and the access request 302 with low priority. A transition request 312 to the shallow sleep state is provided after the access request 301 with high priority, and subsequently the state transitions to the shallow sleep state 322. To further reduce power, the time of the shallow sleep state 321 is lengthened by delaying execution of the access request 306 with low priority in FIG. 8B in comparison to FIG. 8A.

FIG. 8C illustrates another example of scheduling of access requests when power reduction is prioritized. In FIG. 8C, the power reduction is further prioritized over performance as compared to the scheduling in FIG. 8B. In FIG. 8C, time of the shallow sleep state 322 is lengthened by further delaying the access requests 302 to 304 (low priority requests) as compared to the scheduling in FIG. 8B. In addition, a transition to the deep sleep state is made possible by further delaying the access request 306 with low priority. As a result, a transition request 331 to the deep sleep state is provided after the access request 305 with high priority and the state subsequently transitions to the deep sleep state 341 rather than the shallow sleep state 321 (as in FIGS. 8A and 8B).

Notification of the transition determination information from the storage device 1 to the host 2 may be achieved by various methods. When the host 2 and the storage device 1 communicate with each other using a PCIe protocol, the storage device 1 may notify the host 2 of the transition determination information using a message. In this case, a newly defined Vendor_Defined Message may include the transition determination information or a new message format can be standardized to transmit the transition determination information. Alternatively, the transition determination information may be stored in a configuration register in the controller 11 and information in the configuration register may be read and obtained for the host 2, for example, when the storage device 1 is initialized.

When the host 2 and the storage device 1 communicate with each other using an NVMe protocol, the transition determination information may be stored in a register space of the controller 11 and the information in the register may be read and obtained for the host 2, for example, when the storage device 1 is initialized. Alternatively, when an identify command is received from the host 2, the transition determination information may be included in a response to the identify command. Alternatively, an asynchronous event enabling the storage device 1 to notify the host 2 of a message when a predetermined condition is satisfied may be used based on settings configured in advance.

In the first embodiment, for example, the storage device 1 can notify the host 2 of the transition determination information to permit determination of the state that is most suitable to reduce power consumption, in a case where the idle state is to be continued for a predetermined time, from among the idle state, the shallow sleep state, and the deep sleep state. When the host 2 generates access requests to the storage device 1 and schedules the access requests, the host 2 schedules the access requests using the transition determination information and transmits the access requests and the sleep transition request to the storage device 1. The storage device 1 accesses the NAND memory 12 in response to the received access requests. The storage device 1 transitions to the sleep state in response to the received sleep transition request. Thus, it is possible to avoid an increase in a power consumption amount than when the idle state continues.

The host 2 can select the priority of power reduction or priority of performance in accordance with a situation. In the case of the power reduction priority, the host 2 can schedule the access requests and the sleep transition requests so that power reduction efficiency is further improved.

When the access requests and the sleep transition requests are not scheduled like in the first embodiment and, specifically, when there is no sleep transition request from the host 2 and the controller 11 itself determines a sleep transition timing, if an access request is received from the host while the controller 11 is in a process of transiting to the sleep state or a process of returning from the sleep state, movement of the data for the sleep mode should be completed before responding to the access request. Therefore, the performance of the storage device 1 might be reduced. In the first embodiment, however, the access requests and the sleep transition requests are scheduled by the host 2. Therefore, an access request will not be received during the process of transiting to the sleep state or returning from the sleep state and it is possible to avoid the deterioration in the performance.

When the access requests and the sleep transition requests are not scheduled like in the first embodiment, the transition to the deep sleep state, in which a power saving effect is high, might excessively exhaust (wear down) the NAND memory 12. In the first embodiment, however, since the access requests and the sleep transition requests are scheduled, it is possible to prevent unnecessary transitions to the deep sleep state from occurring. As a result, it is possible to prevent the NAND memory 12 from being excessively exhausted due to the saving of the data to the NAND memory 12 in an unnecessary sleep transition.

Second Embodiment

In the first embodiment, the transition from the idle state to the shallow sleep state or the deep sleep state at the time of the idle state has been described. When there are several sleep modes with a plurality of stages, the storage device may transition to the deep sleep mode stage by stage.

Figure 9:
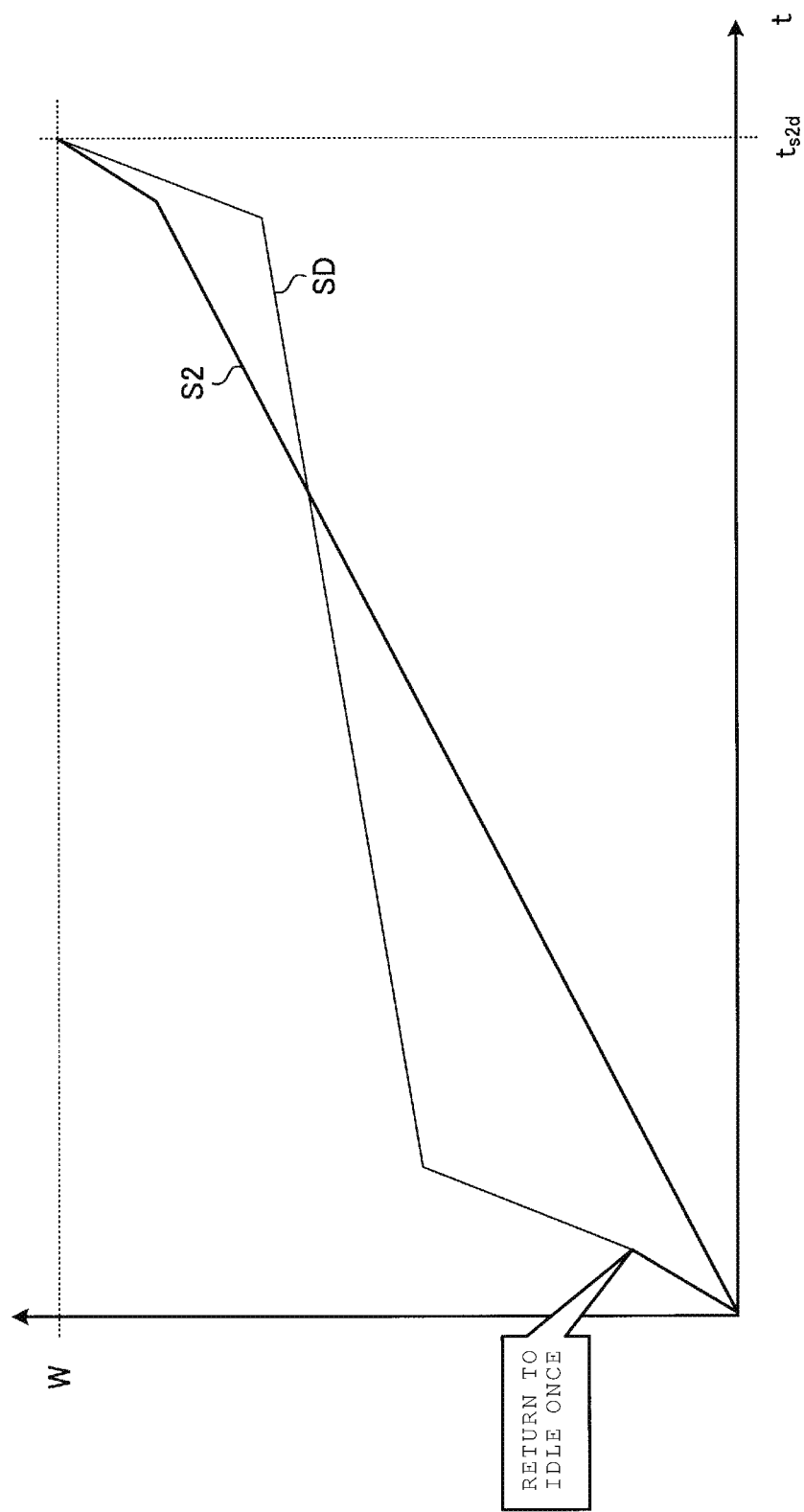
FIG. 9 illustrates an example of a power consumption amount of each of the idle state, the shallow sleep state, and the deep sleep state.

FIG. 9 is a diagram illustrating an example of a power consumption amount of each of the idle state, the shallow sleep state, and the deep sleep state. In FIG. 9, the horizontal axis represents time and the vertical axis represents a power consumption amount. In the drawing, line SD is indicating a power consumption amount when the shallow sleep state transitions to the deep sleep state and a line S2 is indicating a power consumption amount when the shallow sleep state continues. Herein, when the shallow sleep state transitions to the deep sleep state, it is assumed to follow a procedure in which the shallow sleep state returns to the idle state once, and then there is a transition from the idle state to the deep sleep state. This is because when the shallow sleep state transitions to the deep sleep state, the shallow sleep state has to return to an active state to save a value of the register of the processing unit 111, data of the storage unit 112, and data of the volatile memory 13 in the NAND memory 12.

In the shallow sleep state, since the process of transitioning from the idle state to the shallow sleep state has already ended, the save process is not executed and the power consumption amount is indicated by line S2. On the other hand, when the shallow sleep state transitions to the deep sleep state, as described above, the shallow sleep state returns to the idle state and then there is a transition from the idle state to the deep sleep state. Transition to the deep sleep state is the same as the transition described in FIG. 6. A power consumption amount in this case is indicated by the line SD.

Time $t_{s2d}$ at which the line S2 is identical to the line SD is a time at which power consumption amounts of two transition methods are identical to each other. When a time is shorter than time $t_{s2d}$, maintenance of the shallow sleep state leads to power reduction. When a time is longer than time $t_{s2d}$, transition from the shallow sleep state to the deep sleep state leads to power reduction.

Therefore, when transition is executed between a plurality of sleep modes, the transition determination information may further include time $t_{s2d}$. Thus, in the shallow sleep state, the host 2 can select to transition to the deep sleep state when a period of non-access exceeds time $t_{s2d}$. In the transition to the deep sleep state, for example, by receiving a sleep transition request to the deep sleep state from the host 2, since returning to the idle state once, it is possible to execute the save process, and then cause the idle state to transition to the deep sleep state. As another example, it is also possible to cause the shallow sleep state to transition to the deep sleep state by receiving a sleep transition request to the shallow sleep state that includes a condition to transition to the deep sleep state from the host 2. In this case, when the condition to transition to the deep sleep state such as a condition that no access request is made from the host 2 for a predetermined period in the shallow sleep state is satisfied, it is possible to return to the idle state temporarily and transition to the deep sleep state after executing the save process.

Since the scheduling of the access requests and the sleep transition requests in the host 2 and the operation of the storage device 1 at the time of receiving the access requests and the sleep transition requests from the host 2 according to the second embodiment are the same as those of the first embodiment, the description thereof will not be made. Herein, the example in which the transition from the shallow sleep state to the deep sleep state involves a transition to the idle state from the shallow sleep and a transition from the idle state to the deep sleep state has been described. However, in other examples, the shallow sleep state may directly transition to the deep sleep state without transitioning to the idle state. In this case, since the idle state is not achieved, power consumption amount at the time of transition from the shallow sleep state to the deep sleep state may be less than that in FIG. 9.

Third Embodiment

In the first and second embodiments, the examples in which the storage device notifies the host of minimum state continuation times $t_{i2s}$, $t_{i2d}$, $t_{i2d\_good}$, and $t_{s2d}$ in the idle state as the transition determination information have been described. However, as long as the minimum state continuation times $t_{i2s}$, $t_{i2d}$, $t_{i2d\_good}$, and $t_{s2d}$ can be available to the host, the storage device may notify the host of other information such as power consumption levels in the various states and transition processes.

For example, under a condition that $P_i$ is power consumption of the idle state, $P_s$ is power consumption of the shallow sleep state, $W_a$ is a power consumption amount in the save process and the returning process at the time of the shallow sleep state, $P_d$ is power consumption of the deep sleep state, and $W_b$ is a power consumption amount in the save process and the returning process at the time of the deep sleep state, when each time continues for a time t, a power consumption amount $W_i$ at the time of the idle state, a power consumption amount $W_s$ at the time of the shallow sleep state, and a power consumption amount $W_d$ at the time of the deep sleep state can be expressed as in Expressions (1) to (3), respectively:

$$W_i = P_i \cdot t \quad (1)$$

$$W_s = W_a + P_s \cdot t \quad (2)$$

$$W_d = W_b + P_d \cdot t \quad (3)$$

Expression (4) below is obtained from Expressions (1) and (2) as the condition that the power consumption amount $W_s$ of the shallow sleep state is less than the power consumption amount $W_i$ of the idle state:

$$t_{i2s} > W_a/(P_i - P_s) \quad (4)$$

Expression (5) below is obtained from Expressions (1) and (3) as the condition that the power consumption amount $W_d$ of the deep sleep state is less than the power consumption amount $W_i$ of the idle state:

$$t_{i2d} > W_b/(P_i - P_d) \quad (5)$$

Expression (6) below is obtained from Expressions (2) and (3) as the condition that the power consumption amount $W_d$ of the deep sleep state is less than the power consumption amount $W_s$ of the shallow sleep state:

$$t_{i2d\_good} > (W_b - W_a)/(P_s - P_d) \quad (6)$$

Expression (7) below should be satisfied so that the power consumption amount $W_d$ of the deep sleep state is less than the power consumption amount $W_s$ of the shallow sleep state:

$$W_a/2 + W_b + P_d \cdot t < W_a/2 + P_s \cdot t \quad (7)$$

When Expressions (2) and (3) are substituted into Expression (7), Expression (8) below is obtained as the condition that the power consumption amount $W_d$ of the deep sleep state is less than the power consumption amount $W_s$ of the shallow sleep state:

$$t_{s2d} > W_b/(P_s - P_d) \quad (8)$$

As expressed in Expressions (4) to (6) and (8), the state continuation times $t_{i2s}$, $t_{i2d}$, $t_{i2d\_good}$, and $t_{s2d}$ of the sleep state can be obtained when the power consumption $P_i$ of the idle state, the power consumption $P_s$ of the shallow sleep state, the power consumption amount $W_a$ of the save process and the returning process in the shallow sleep state, the power consumption $P_d$ of the deep sleep state, and the power consumption amount $W_b$ of the save process and the returning process in the deep sleep state are known. Therefore, the power consumption $P_i$ of the idle state, the power consumption $P_s$ of the shallow sleep state, the power consumption amount $W_a$ of the save process and the returning process in the shallow sleep state, the power consumption $P_d$ of the deep sleep state, and the power consumption amount $W_b$ of the save process and the returning process in the deep sleep state may be provided as the transition determination information.

Since the configuration of the storage device 1 and the power control method for the storage device 1 according to the third embodiment are the same as those of the first embodiment, the description thereof will not be made.

According to the third embodiment, it is possible to obtain the same advantages as those of the first embodiment. The host 2 can also execute another calculation using such numerical values by providing the host 2 with the values of the power consumption $P_i$ of the idle state, the power consumption $P_s$ of the shallow sleep state, the power consumption amount $W_a$ of the save process and the returning process in the shallow sleep state, the power consumption $P_d$ of the deep sleep state, and the power consumption amount $W_b$ of the save process and the returning process in the deep sleep state.

Fourth Embodiment

A sleep transition time in which power reduction is effective considerably depends on the power to be consumed in a save process and a returning process, and this power depends on the amount of data to be saved at the time of sleep transition. On the other hand, in a storage device, the amount of data to be saved varies in accordance with an amount of data to be buffered when a sleep transition request comes from a host. In the first to third embodiments, the minimum state continuation times of the sleep state or the power consumption amount in the save process and the returning process in each sleep state, which is obtained under the condition that the amount of data to be saved is fixed in advance, has been used as the transition determination information. Therefore, when the amount of data to be buffered is far from the fixed value, the transition to the sleep state might be disadvantageous from the viewpoint of the power reduction. Accordingly, an example in which transition determination information is dynamically updated and a host is notified of the transition determination information will be described in a fourth embodiment.

A storage device 1 according to the fourth embodiment is substantially the same as the storage device described in the first embodiment, but the processing unit 111 of the controller 11 has an additional function. The processing unit 111 in the fourth embodiment acquires the size of the data to be buffered in the storage unit 112 and the volatile memory 13 at a certain timing. The processing unit 111 may estimate the amount of data to be buffered in the storage unit 112 and the volatile memory 13 from an access request received from the host 2. The processing unit 111 calculates the power consumption amount $W_a$ necessary for the save process and the returning process in the shallow sleep state and the power consumption amount $W_b$ necessary for the save process and the returning process in the deep sleep state from the amount of acquired data. Then, the processing unit 111 calculates the minimum state continuation times $t_{i2s}$, $t_{i2d}$, and $t_{i2d\_good}$ of the sleep state as in the first embodiment, calculates the time $t_{s2d}$ in addition to the minimum state continuation times as in the second embodiment, and notifies the host 2 of these calculated times as the transition determination information. The processing unit 111 can also notify the host 2 of the calculated values $W_a$, $W_b$, $P_i$, $P_s$, and $P_d$ as the transition determination information as in the third embodiment. The host 2 updates the transition determination information when the storage device 1 notifies the host 2 of the transition determination information.

Any timing at which the processing unit 111 acquires the size of data buffered in the storage unit 112 and the volatile memory 13 and any timing at which the host 2 is notified of the transition determination information can be used. For example, the size of data may be acquired and the transition determination information may be sent at a predetermined time interval or when the amount of buffered data is changed by a predetermined percentage or more. The processing unit 111 may acquire an average value of the amount of data buffered in the storage unit 112 and the volatile memory 13 over a predetermined period and may execute a process using this average value.

Figure 10A:
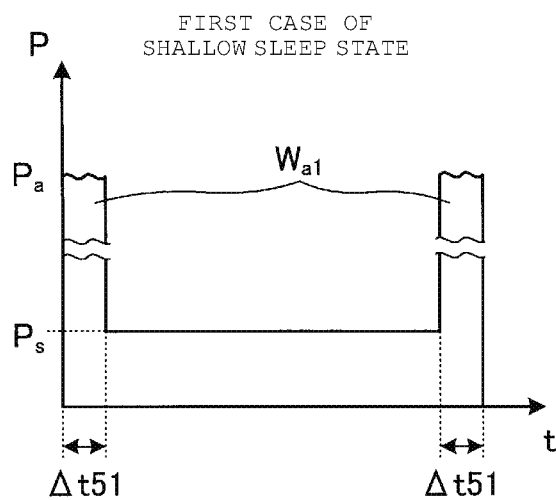
FIGS. 10A and 10B are diagrams illustrating a change of power consumption at the time of transition from the idle state to the shallow sleep state.
Figure 10B:
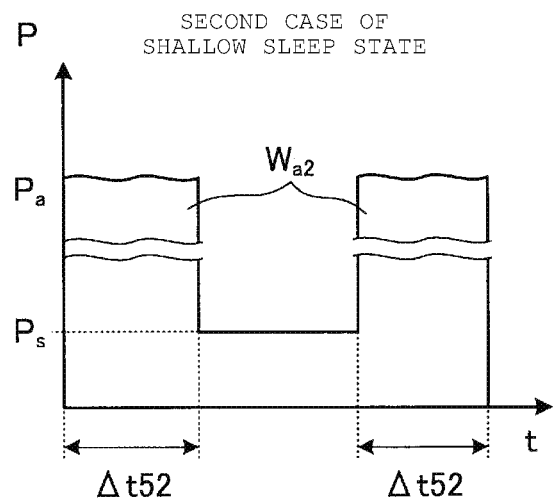

FIGS. 10A and 10B are diagrams illustrating a change of power consumption during transition from the idle state to the shallow sleep state. FIGS. 11A and 11B are diagrams illustrating a change of power consumption amount during transition from the idle state to the shallow sleep state. FIGS. 10A and 11A illustrate a first case in which the amount of data to be saved is low. FIGS. 10B and 11B illustrate a second case in which an amount of data to be saved is greater than in the first case. FIG. 12 is a diagram illustrating an example of a relation between power consumption amounts of the shallow sleep state and the idle state.

As illustrated in FIGS. 10A and 10B, power consumption $P_s$ of the shallow sleep state is the same between the first and second cases, and the power consumption $P_a$ of the save process and the returning process is also the same between the first and second cases. However, it takes a longer time to save a larger amount of data. Thus, the time necessary for the save process and for the returning process of the first case (Δt51) is shorter than the time required for the save process and for the returning process of the second case (Δt52).

Therefore, as illustrated in FIGS. 11A and 11B, a power consumption amount for maintaining the shallow sleep state for a certain period is also different between the first and second cases. That is, a power consumption amount Wa1 of the save process and the returning process of the first case is less than a power consumption amount Wa2 of the save process and the returning process of the second case.

As illustrated in FIG. 12, time $t_{i2s}$ in which the shallow sleep state should continue in order to cause the power consumption amount to be less than when the idle state is maintained is also different between the first and second cases. Specifically, as the amount of saved data is larger, time $t_{i2s}$ in which the shallow sleep state should continue tends to be longer.

For example, when a line S3 indicating a power consumption amount in the first case is compared to a line I1 indicating a power consumption amount in the idle state, transition to the shallow sleep state is more advantageous than continuation of the idle state in terms of power if the shallow sleep state continues for $t_{i2s\_case1}$ or more. On the other hand, when a line S4 indicating a power consumption amount in the second case is compared to the line I1 of the idle state, transition to the shallow sleep state is more advantageous than continuation of the idle state in terms of power when the shallow sleep state continues for $t_{i2s\_case2}$ or more. Here, $t_{i2s\_case2}$ is longer than $t_{i2s\_case1}$.

FIG. 12 illustrates the line S1 indicating the power consumption amount when the amount of data to be saved is fixed like in the first embodiment, and the state continuation time $t_{i2s}$ in which the power consumption amount in continuation of the shallow sleep state plus the transitions to and from the shallow sleep state matches the power consumption amount in continuation of the idle state. For example, when the host 2 is notified of the state continuation time $t_{i2s}$ as the transition determination information (like the first embodiment) and there is a time in which a process is not executed for time $t_{i2s}$ or more, the transition to the shallow sleep state is more advantageous than the continu- ation of the idle state in terms of power consumption. In the first case in which the amount of data to be saved is less, $t_{i2s\_case1}$ is less than $t_{i2s}$. Therefore, reduction in power consumption amount is achieved by the transition to the shallow sleep state.

Conversely, in the second case in which the amount of data to be saved is greater, $t_{i2s\_case2}$ is greater than $t_{i2s}$. Therefore, when a time in which the shallow sleep state continues is $t_{i2s}$, the power consumption amount in the idle state decreases. That is, in the second case, a reduction in power consumption amount is not achieved by the transition to the shallow sleep state. Rather, the power consumption amount may increase. This idea can also be applied to transition to the other sleep modes (e.g., the deep sleep state).

In this way, when the fixed state continuation time is used irrespective of the amount of data to be saved, as in the first to third embodiments, a consumed power amount may increase due to the transition to the sleep state as in the foregoing second case. In the fourth embodiment, on the other hand, the amount of data that is buffered in the storage unit 112 and the volatile memory 13 is tracked/known, the appropriate state continuation time $t_{i2s}$ is calculated based on this amount of data, and the host 2 is notified of the calculated state continuation time $t_{i2s}$ at predetermined tim- ings. Since precision of the state continuation time $t_{i2s}$ is improved in this manner, the access requests and the sleep transition requests to the storage device 1 by the host 2 can be further optimized compared to the first embodiment. Thus, it is possible to obtain the advantage of further reducing power consumption.

In some examples, the host 2 can be notified of $W_a$, $W_b$, $P_i$, $P_s$, and $P_d$ like in the third embodiment, rather than an already calculated state continuation time $t_{is2}$, but the pre- cision of the power consumption amount $W_a$ of the save process and the returning process in the shallow sleep state and the power consumption amount $W_b$ of the save process and the returning process in the deep sleep state is still improved. Therefore, the access requests and the sleep transition requests by the host 2 can be further optimized as compared to the third embodiment. Thus, it is possible further reduce power consumption.

Fifth Embodiment

In the first to fourth embodiments, the method in which the host issues the sleep transition request to the storage device at an appropriate timing has been described. How- ever, the storage device may be operating without a transi- tion to the sleep state not based on an access request from the host, but based on an internal operation such as garbage collection. When a state-based process of the storage device (hereinafter referred to as a background process) is executed irregularly and apart from direct instruction from the host, the power reduction effect obtained by the scheduling of sleep transition requests by the host for purposes of reduced power consumption or the like might deteriorate. Accord- ingly, in the fifth embodiment, an example including a background process will be described.

A storage device 1 according to the fifth embodiment is substantially the same as the storage device described in the first embodiment, but the processing unit 111 of the con- troller 11 has an additional function of performing back- ground processes. When background process timing infor- mation that includes a process recommendation notification is received from the host 2, the processing unit 111 executes a background process outside of host-scheduled process times as much as possible. However, since the host 2 cannot always determine how frequently, how long a background process takes, or even whether the background process will be executed, the controller 11 can execute the background process whenever possible as long as the background process timing information has been received from the host 2. As described above, a garbage collection process is exemplified as a background process. For example, the processing unit 111 waits for a predetermined time without executing the background process. When the processing unit 111 receives the process timing information from the host 2 within a predetermined time, the processing unit 111 executes the background process so that the power reduction effect does not deteriorate. In this case, for example, when the execution of the background process has not yet commenced and the background process timing information is received from the host 2, the processing unit 111 does not execute the background process.

The host 2 sets a time at which the background process can be executed as a scheduling event in the scheduling of the access requests and the sleep transition requests for the storage device 1 and transmits the background process time information to the storage device 1. For example, a time at which the idle state continues for a predetermined time or a time at which an access request with low priority continues can be used as the time at which the background process can be executed. The time for which the idle state continues for the predetermined time may include a time for which it is determined that the sleep transition will not be executed for a predetermined period, or a time during which the access request to the storage device 1 is cut off, but the sleep transition is not executed until a subsequent access request. In this case, a period in which the sleep transition is not executed may also be selected.

The background process timing information may include a process non-recommendation notification rather than a process recommendation notification. For example, regarding the transition to the deep sleep state, the state cannot transition to the deep sleep state if a considerably long continuous time is not provided. Thus, the frequency of the transition to the deep sleep state is considered to be low. Accordingly, before the host 2 issues the transition request for the deep sleep state, the host 2 notifies the storage device 1 of the background process timing information that includes the process non-recommendation notification indicating that the transition to the deep sleep state is to be executed as early as possible. When the processing unit 111 of the storage device 1 receives the background process timing information that includes the process non-recommendation notification, the processing unit 111 does not execute the background process before the transition request to the deep sleep state is received and then the deep sleep state ends.

Figure 13:
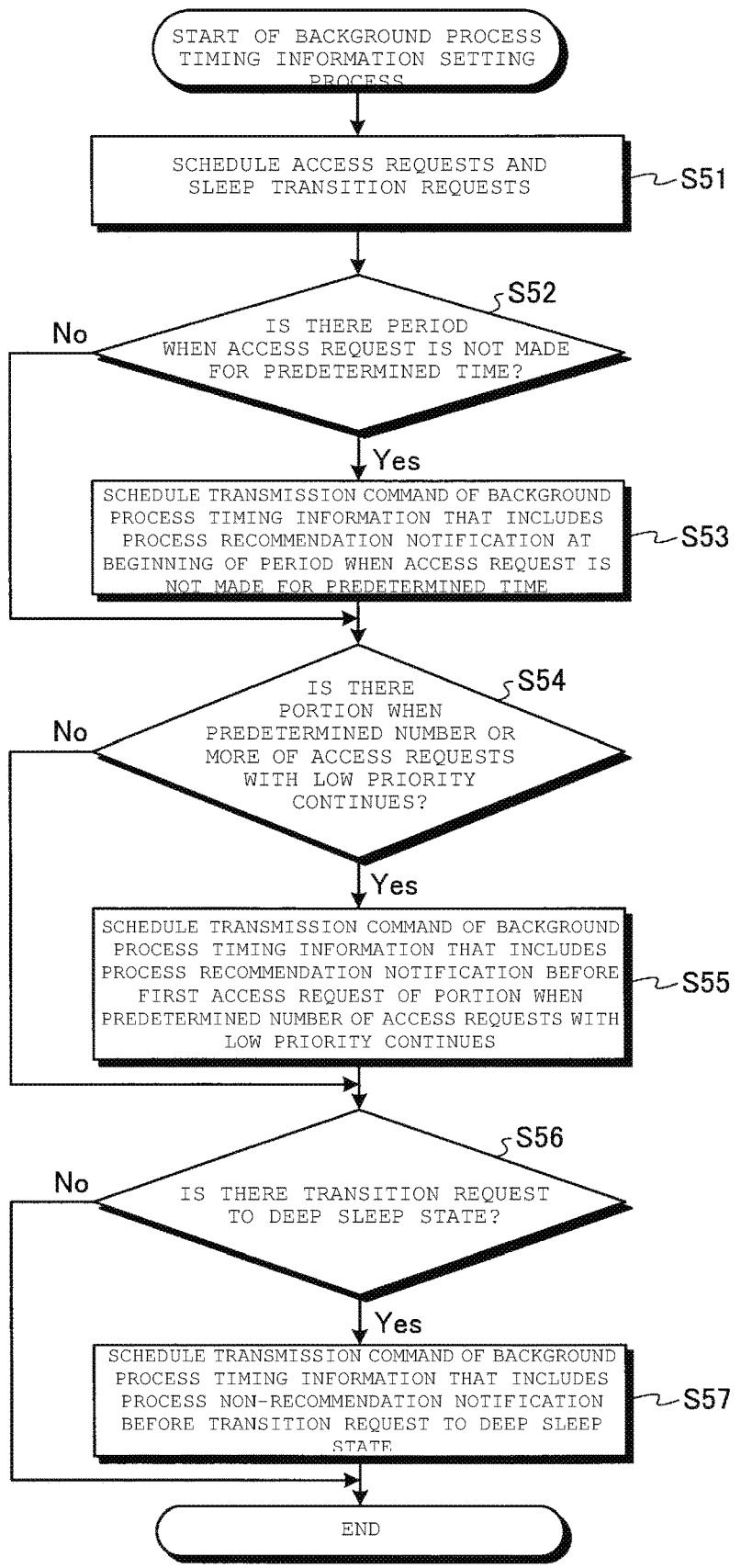
FIG. 13 is a flowchart of a setting procedure of process timing information in a host according to a fifth embodiment.

FIG. 13 is a flowchart illustrating an example of a setting procedure of the background process timing information in the host according to the fifth embodiment. The processing unit 21 of the host 2 schedules access requests and sleep transition requests (step S51) and subsequently determines whether there is a period in which an access request is not made for a predetermined time (step S52). When there is the period in which the access request is not made for the predetermined time (Yes in step S52), the processing unit 21 schedules, for example, a command to transmit the background process timing information that includes the process recommendation notification in start of the period in which the access request is not made for the predetermined time (step S53). At this time, the process recommendation notification may include the period in which the access request is not made. The processing unit 21 may also schedule a command to transmit the background process timing information that includes a process non-recommendation notification indicating that the transition to the deep sleep state is to be executed as early as possible.

After step S53 or when there is no period in which the access request is not made for the predetermined time (No in step S52), the processing unit 21 determines whether there is a portion of the schedule in which a predetermined number or more of access requests with low priority continues (step S54) are made. When there is the portion of the schedule with more than the predetermined number of access requests with low priority in continuous sequence (Yes in step S54), the processing unit 21 schedules, for example, a command to transmit the background process timing information that includes the process recommendation notification before the first access request of the portion of the schedule in which the sequence of low priority access requests occurs (step S55). The access request with low priority is an access request for which a response to the access request may be delayed. The processing unit 21 may schedule a command to transmit the background process timing information that includes the process non-recommendation notification indicating that the transition to the deep sleep state is to be executed as early as possible.

After step S54 or if there is no portion of the schedule with the predetermined number or more of low priority access requests in sequence (No in step S54), the processing unit 21 determines whether there is the transition request to the deep sleep state (step S56). When there is the transition request to the deep sleep state (Yes in step S56), the processing unit 21 schedules a command to transmit the background process timing information that includes the process non-recommendation notification before the transition request to the deep sleep state (step S57), and then the process ends. Likewise, when there is no transition request to the deep sleep state (No in step S56), the process also ends.

In the flowchart of FIG. 7 according to the first embodiment, the example in which the host 2 notifies the storage device 1 of the returning time has been described. However, in the process in FIG. 13, a command to transmit the background process timing information that includes the process recommendation notification or the process non-recommendation notification is transmitted from the host 2 to the storage device 1. In this case, in step S25 of FIG. 7, the processing unit 111 does not determine the returning time but determines whether there is a background process to be executed before the returning time of storage device 1.

Figure 14:
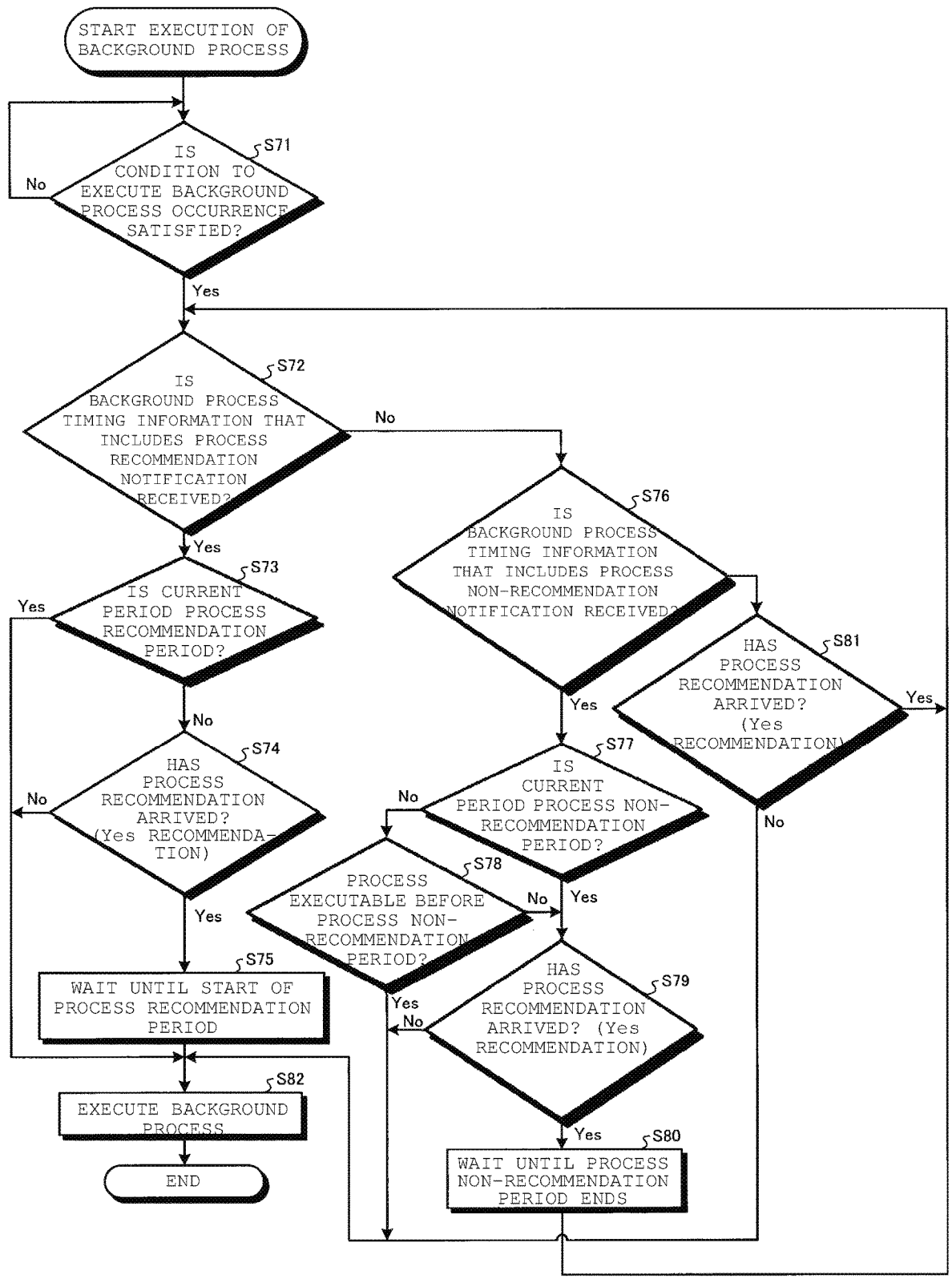
FIG. 14 is a flowchart of an execution procedure of a background process in a host according to the fifth embodiment.

FIG. 14 is a flowchart illustrating an example of an execution procedure of a background process according to the fifth embodiment. First, the processing unit 111 of the controller 11 determines whether a condition to execute a background process has been satisfied (step S71). When the condition to execute the background process is not satisfied (No in step S71), a standby state is set. When the condition for occurrence of the background process is satisfied (Yes in step S71), the processing unit 111 determines whether the background process timing information that includes the process recommendation notification has been received from the host 2 (step S72). When the process timing information is received (Yes in step S72), the processing unit 111 determines whether the current period is a process recommendation period (step S73). When the current period is the process recommendation period (Yes in step S73), the processing unit 111 executes the background process (step S82), and then the process ends.

When the current period is not the process recommendation period (No in step S73), the processing unit 111 determines whether to wait until the process recommendation period arrives without executing the background process (step S74). Herein, it is normally recommended that the processing unit 111 waits until the process recommendation period arrives. However, when there is the background process with emergency priority or the like and the processing unit 111 cannot wait until the process recommendation period (No in step S74), the process proceeds to step S82. Conversely, when the processing unit 111 can wait until the process recommendation period (Yes in step S74), the processing unit 111 waits until start of the process recommendation period. When the process recommendation process comes, the process proceeds to step S82.

When the background process timing information that includes the process recommendation notification is not received in step S72 (No in step S72), the processing unit 111 determines whether the background process timing information that includes the process non-recommendation notification has been received (step S76). When the background process timing information that includes the process non-recommendation notification is received (Yes in step S76), the processing unit 111 determines whether the current period is the process non-recommendation period (step S77).

When the current period is the process non-recommendation period (Yes in step S77), the processing unit 111 determines whether to wait until the process recommendation period (step S79). It is normally recommended that the processing unit 111 waits until the process recommendation period. However, when the processing unit 111 cannot wait until the process recommendation period arrives (No in step S79), the process proceeds to step S82. Conversely, when the processing unit 111 can wait until the process recommendation period (Yes in step S79), the processing unit 111 waits until the process non-recommendation period ends (step S80), and then the process proceeds to step S72.

When the current period is not the process non-recommendation period (No in step S77), the processing unit 111 determines whether the background process can be executed before the process non-recommendation period is scheduled to arrive (step S78). When the process cannot be executed before the process non-recommendation period arrives (No in step S78), the process proceeds to step S79. Conversely, when the process can be executed before the process non-recommendation period (Yes in step S78), the process proceeds to step S82.

When the background process timing information that includes the process non-recommendation notification is received in step S76 (No in step S76), the processing unit 111 does not execute the background process and determines whether to wait until the process recommendation period arrives (step S81). It is normally recommended that the processing unit 111 waits until the process recommendation period. However, when the processing unit 111 cannot wait until the process recommendation period arrives (No in step S81), the process proceeds to step S82. Conversely, when the processing unit 111 can wait until the process recommendation period (Yes in step S81), the process proceeds to step S72.

FIG. 15 is a diagram schematically illustrating a relation of notification between scheduled access requests and background processing timing information according to the fifth embodiment. Since the access requests 302 to 304 with low priority are continuously executed, a command 351 to transmit the background process timing information that includes the process recommendation notification is scheduled to be sent before the access request 302 (having low priority). As a result, for example, when the access request 302 is received and the storage device 1 has a background process to be executed, the background process 361 is executed.

The access requests are cut off for a period between the access request 304 (with low priority) and the access request 305 (with high priority). However, a command 352 to transmit the background process timing information that includes the process recommendation notification indicating that the sleep transition request is not issued until a subsequent access request is scheduled after the access request 304. As a result, when the background process timing information is received and the storage device 1 has a background process to be executed, the background process 362 is executed. There is also a period in which access requests are not made between the access request 306 (with low priority) and the access request 307 (with high priority). In this case, a command 353 to transmit the background process timing information that includes the process recommendation notification is scheduled to be sent. As a result, when the background process timing information is received and the storage device 1 has a background process to be executed, the background process 363 is executed. In this case, the background process timing information may include a time period in which a sleep transition request is not issued.

When the device state transitions to the deep sleep state 341 in response to the transition request 331 after the access request 305, background process timing information 354 that includes the process non-recommendation notification indicating that the background process is not to be executed during this period to issue the sleep transition request 331 later is transmitted, for example, before the access request 302. Thus, the background process is not executed in the middle of the deep sleep state 341.

FIG. 16 is a diagram schematically illustrating transition to a sleep state and an example of an execution of a background process according to a comparative example. When the background process timing information is not notified as the fifth embodiment, the storage device 1 executes a background process when access requests are not being made. In FIG. 16, an access request 305 with high priority is received and the background process 364 is executed after the process ends. As a result, even when the sleep transition request 331 (to the deep sleep state) is issued from the host 2 after the access request 305, the storage device 1 executes the background process 364 rather than enters the deep sleep state. Therefore, the device state does not transition to the deep sleep state as intended by the host 2. After the background process 364 is completed, the device state transitions to the deep sleep state 341a. As a result, although a period equal to or greater than $t_{i2d\_good}$ was to be provided between the access request 305 (with high priority) and the access request 306 (with low priority), because the device performed the background process 364, a period less than $t_{i2d\_good}$ is provided for the intended deep sleep state. Thus, there is a concern the power reduction effect will not be achieved due to the transition to the deep sleep state 341a.

However, in the fifth embodiment, when an access request is not to be made for a predetermined time (i.e., when the device state is not to transition to the sleep state), the access requests with low priority are to continue, or a sleep transition request to the deep sleep state is to be issued, the host 2 transmits the background process timing information to the storage device 1. When the condition to execute a background process is satisfied, the storage device 1 does not immediately execute the background process but rather waits for the background process timing information to be subsequently received and executes the background process according to this information (excepting for emergency or urgent background processes which are not to be delayed). Thus, in general, the background process is only executed during times when the access requests are not made, or there is an extended sequence of low priority access requests, or when there is no sleep transition request. Therefore, it is possible to realize the sleep transition expected by the host 2 and maintain the sleep transition timings and settings as intended. As a result, it is possible to prevent the power reduction effect from deteriorating due to a sleep transition instructed by the host 2 not being realized as intended.

In the foregoing description, examples in which two sleep modes are provided have been described, but other examples including three or more sleep modes are contemplated. In the foregoing description, the example in which the storage device 1 includes the volatile memory 13 has been described, but in some embodiments the volatile memory 13 may not be provided. Alternatively, in some examples, the power circuit 14 may be contained in the controller 11. In the foregoing description, the example in which the NAND memory 12 is a storage medium has been described, but the embodiments are not limited thereto. For example, a magnetic disk or the like may be used as the storage medium.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
    a nonvolatile memory;
    a controller configured to control access to the nonvolatile memory; and
    a power circuit configured to supply power to the nonvolatile memory and the controller, and turn on or off the supply of power to at least parts of the nonvolatile memory and at least parts of the controller, wherein
    the controller is further configured to:
        execute a save process for data when a sleep transition request is received requesting at least one of a plurality of sleep states, the save process being executed according to a requested sleep state of the sleep transition request, and
        notify a host of first information that includes at least one of a power consumption amount for a transition to a first sleep state from an idle state and a power consumption amount for a transition from the first sleep state to the idle state, the first sleep state being a sleep state among the plurality of sleep states, and
    the first information includes a time length of the first sleep state for which total power consumption amount including at least one of the power consumption amount for the transition to the first sleep state from the idle state and the power consumption amount for the transition from the first sleep state to the idle state is less than power consumption amount for maintaining the idle state for the time length.

2. The storage device according to claim 1, wherein, when the save process for the data ends, the power circuit stops the supply of the power to a part of the controller or the nonvolatile memory according to the requested sleep state.

3. The storage device according to claim 1, wherein the first information further includes the time length of the first sleep state for which a total power consumption amount is less than a total power consumption amount of a second sleep state, with the total power consumption amounts including power amount consumed by transitions from the idle state to the respective first or second sleep state and transitions from the respective first or second sleep state to the idle state, the second sleep state being another sleep state among the plurality of sleep states.

4. The storage device according to claim 1, wherein the controller is configured to notify the host of the first information upon initialization of the controller.

5. The storage device according to claim 1, wherein the controller is configured to send the host the first information when the save process for the data is executed according to the sleep transition request.

6. The storage device according to claim 1, further comprising:
    a storage unit in the controller; and
    a volatile memory connected to the controller, wherein
    when the requested sleep state is a shallow sleep state, data in the storage unit is transferred to the volatile memory and power to at least a part of the non-volatile memory and the storage unit is turned off from the power circuit, and
    when the requested sleep state is a deep sleep state, data in the storage unit and the volatile memory is stored in the non-volatile memory, and power to at least a part of the non-volatile memory, the volatile memory, and the storage unit is turned off from the power circuit.

7. A power control method for a storage device including a nonvolatile memory, a controller controlling access to the nonvolatile memory, and a power circuit for switching ON and OFF of supply of power to the nonvolatile memory and the controller, the method comprising:
    sending a host connected to the storage device first information that includes information related to at least one of a power consumption amount in an idle state of the storage device or power consumption amounts for transitions to and from the idle state for each sleep state among a plurality of sleep states of the storage device;
    receiving an access request for the nonvolatile memory or a sleep transition request for requesting transition to a requested sleep state from among the plurality of sleep states;
    executing a save process according to the requested sleep state when the sleep transition request is received; and
    stopping the supply of the power to at least a part of the controller or the nonvolatile memory in response to the requested sleep state after the save process for the data ends, wherein
    the host schedules access requests and sleep transition requests according to the first information, and
    the first information includes a time length for a first sleep state for which the power consumption amount is less than the power consumption amount in the idle state.

8. The power control method according to claim 7, wherein the first information includes a time length for a first sleep state for which the power consumption amount is less than the power consumption amount in the idle state.

9. The power control method according to claim 7, wherein the first information includes a time length of the first sleep state for which total power consumption amount including the power consumption amount for the transition to the first sleep state from the idle state and the power consumption amount for the transition from the first sleep state to the idle state is less than power consumption amount for maintaining the idle state.

10. The power control method according to claim 9, wherein the first information further includes a time length of the first sleep state for which a total power consumption amount is less than a total power consumption amount of a second sleep state, with the total power consumption amounts including power amount consumed by transitions from the idle state to the respective first or second sleep state and transitions from the respective first or second sleep state to the idle state, the second sleep state being a sleep state among the plurality of sleep states of the storage device.

11. The power control method according to claim 7, wherein the first information is sent to the host upon initialization of the storage device.

12. The power control method according to claim 7, wherein the first information is sent to the host when the save process is executed according to the sleep transition request.

13. The power control method according to claim 7, further comprising:
  receiving process recommendation notification from the host indicating that a background process can be executed by the controller; and
  executing the background process after the process recommendation notification is received.

* * * * *